(12) United States Patent
Bode et al.

(10) Patent No.: US 12,074,685 B2
(45) Date of Patent: Aug. 27, 2024

(54) SATELLITE CONTACT CUSTOMIZATION

(71) Applicant: Atlas Space Operations, Inc., Traverse City, MI (US)

(72) Inventors: Brad Arnold Bode, Pacific Palisades, CA (US); Kyle Stephen Polich, Los Angeles, CA (US)

(73) Assignee: Atlas Space Operations, Inc., Traverse City, MI (US)

( * ) Notice: Subject to any disclaimer, the term of this patent is extended or adjusted under 35 U.S.C. 154(b) by 0 days.

(21) Appl. No.: 18/447,133

(22) Filed: Aug. 9, 2023

(65) Prior Publication Data

US 2023/0412260 A1 Dec. 21, 2023

Related U.S. Application Data

(62) Division of application No. 17/327,068, filed on May 21, 2021, now Pat. No. 11,770,184.

(51) Int. Cl.
*H04B 7/185* (2006.01)

(52) U.S. Cl.
CPC ..... *H04B 7/18547* (2013.01); *H04B 7/18513* (2013.01); *H04B 7/18519* (2013.01); *H04B 7/18526* (2013.01); *H04B 7/18539* (2013.01)

(58) Field of Classification Search
CPC ........ H04B 7/185–195; H04B 7/18547; H04B 7/18513; H04B 7/18519; H04B 7/18526; H04B 7/18539
See application file for complete search history.

(56) References Cited

U.S. PATENT DOCUMENTS

| | | | |
|---|---|---|---|
| 5,918,157 | A | 6/1999 | Wiedeman et al. |
| 6,690,934 | B1 | 2/2004 | Conrad, Jr. et al. |
| 8,639,182 | B2 | 1/2014 | Moore, III |
| 9,059,784 | B2 | 6/2015 | Enge et al. |
| 10,225,000 | B1 | 3/2019 | Chowdhury et al. |

(Continued)

FOREIGN PATENT DOCUMENTS

| | | | |
|---|---|---|---|
| CN | 103648132 | A | 3/2014 |
| EP | 1031242 | B1 | 8/2000 |

(Continued)

OTHER PUBLICATIONS

Bode, Corrected Notice of Allowability dated Sep. 22, 2020, directed to U.S. Appl. No. 16/290,734; 3 pages.

(Continued)

*Primary Examiner* — Raymond S Dean
(74) *Attorney, Agent, or Firm* — Morrison & Foerster LLP

(57) ABSTRACT

Described herein are systems, methods, media, and devices for generating a satellite program for contacting satellites. In some embodiments, data including one or more targets for accessing a satellite constellation is obtained. Based on the data, a set of representations may be generated and candidate satellite constellation access programs may be determined based on the set of representations. For each program, a first score may be computed for each target to obtain a first set of scores, and a second score may be computed for each first score of the first set of scores to obtain a second set of scores. A satellite constellation access program may be selected from the candidate satellite access programs based on the second set of second scores.

19 Claims, 23 Drawing Sheets

(56) References Cited

U.S. PATENT DOCUMENTS

| | | |
|---|---|---|
| 10,659,148 B2 | 5/2020 | Trutna et al. |
| 11,463,158 B2* | 10/2022 | Devaraj ............ H04B 7/18513 |
| 11,488,046 B2 | 11/2022 | McCormick |
| 2003/0081582 A1 | 5/2003 | Jain et al. |
| 2004/0111465 A1 | 6/2004 | Chuang et al. |
| 2005/0037706 A1 | 2/2005 | Settle |
| 2006/0135058 A1 | 6/2006 | Karabinis |
| 2012/0131650 A1 | 5/2012 | Gutt et al. |
| 2013/0329630 A1 | 12/2013 | Becker |
| 2015/0215670 A1 | 7/2015 | Patel et al. |
| 2016/0037434 A1 | 2/2016 | Gopal et al. |
| 2018/0034536 A1* | 2/2018 | Trutna ............... H04B 7/18521 |
| 2018/0083741 A1 | 3/2018 | Motoyoshi |
| 2018/0098247 A1 | 4/2018 | Gopal et al. |
| 2018/0167136 A1 | 6/2018 | Eickhoff |
| 2018/0183855 A1 | 6/2018 | Sabella et al. |
| 2018/0198516 A1 | 7/2018 | Garcia et al. |
| 2018/0227272 A1 | 8/2018 | Zaruba et al. |
| 2018/0278323 A1 | 9/2018 | Trutna |
| 2018/0309507 A1* | 10/2018 | Vaughan ................. H04B 7/19 |
| 2019/0121665 A1 | 4/2019 | Clancy |
| 2019/0253133 A1 | 8/2019 | Choquette |
| 2019/0313357 A1 | 10/2019 | Wang et al. |
| 2019/0377989 A1* | 12/2019 | Dizengof ................ G06F 9/448 |
| 2020/0007224 A1 | 1/2020 | Hawthorne et al. |
| 2020/0007414 A1 | 1/2020 | Smith et al. |
| 2020/0280366 A1 | 9/2020 | Bode |
| 2020/0380056 A1 | 12/2020 | Morris et al. |
| 2021/0044348 A1 | 2/2021 | Bode |
| 2021/0044350 A1 | 2/2021 | Karim |
| 2021/0126704 A1 | 4/2021 | McDaniel |
| 2021/0247519 A1* | 8/2021 | Reid ........................ G01S 19/02 |
| 2021/0263164 A1* | 8/2021 | Gunning ................. G01S 19/07 |
| 2022/0038172 A1 | 2/2022 | Kargieman |
| 2022/0216911 A1 | 7/2022 | McDaniel |
| 2022/0329485 A1 | 10/2022 | McCormick |
| 2022/0360323 A1 | 11/2022 | Dooling |
| 2022/0360518 A1 | 11/2022 | McCormick et al. |
| 2023/0130388 A1* | 4/2023 | Reid ........................ G01S 19/14 |
| | | 342/357.44 |
| 2024/0056556 A1 | 2/2024 | Aoki |
| 2024/0129027 A1 | 4/2024 | Bode |

FOREIGN PATENT DOCUMENTS

| | | |
|---|---|---|
| EP | 2779481 A1 | 9/2014 |
| JP | 2001-285170 A | 10/2001 |
| JP | 2001-522177 A | 11/2001 |
| JP | 2002-27009 A | 1/2002 |
| JP | 2018-530200 A | 10/2018 |
| KR | 10-2013-0129363 A | 11/2013 |
| KR | 10-2019-0116385 A | 10/2019 |
| WO | 99/22529 A1 | 5/1999 |
| WO | 2020/006160 A1 | 1/2020 |

OTHER PUBLICATIONS

Bode, U.S. Office Action dated Apr. 3, 2020, directed to U.S. Appl. No. 16/290,734; 8 pages.

Decision to Grant a Patent dated Jun. 30, 2023, directed to JP Application No. 2021-552242; 5 pages.

Extended European Search Report dated Oct. 17, 2022, directed to EP Application No. 20766418.6; 11 pages.

First Office Action dated Feb. 4, 2024, directed to CN Application No. 202080032184.3; 16 pages.

Hearing Notice dated Jan. 15, 2024, directed to IN Application No. 202147044702; 3 pages.

International Search Report and Written Opinion mailed Feb. 18, 2021, directed to International Application No. PCT/US2020/057381; 9 pages.

International Search Report and Written Opinion mailed Jun. 5, 2020, directed to International Application No. PCT/US2020/016988; 13 pages.

McDaniel, U.S. Office Action mailed Aug. 2, 2023, directed to U.S. Appl. No. 17/578,046; 7 pages.

McDaniel, U.S. Office Action mailed Feb. 15, 2023, directed to U.S. Appl. No. 17/578,046; 26 pages.

McDaniel, U.S. Office Action mailed Mar. 18, 2021, directed to U.S. Appl. No. 16/663,990; 25 pages.

Notice of Reasons for Refusal dated Dec. 20, 2022, directed to JP Application No. 2021-552242; 10 pages.

Office Action dated Apr. 8, 2022, directed to IN Application No. 202147044702; 6 pages.

Office Action dated Dec. 26, 2022, directed to SG Application No. 11202109558U; 8 pages.

Hu, P. (Dec. 2021). "Closing the Management Gap for Satellite-Integrated Community Networks: A Hierarchical Approach to Self-Maintenance," IEEE Communications Magazine 59(12):43-49.

International Search Report and Written Opinion mailed Apr. 15, 2024, directed to International Application No. PCT/US2023/071457; 18 pages.

Kodheli et al. (Oct. 2020). "Satellite Communications in the New Space Era: A Survey and Future Challenges," IEEE Communications Surveys & Tutorials, 23(1):70-109.

Vazquez et al. (Mar. 2021). "Machine Learning for Satellite Communications Operations," IEEE Communications Magazine 59(2):22-27.

* cited by examiner

SATELLITE CONTACT CUSTOMIZATION

CROSS-REFERENCE TO RELATED APPLICATIONS

This application is a divisional of U.S. application Ser. No. 17/327,068, filed on May 21, 2021, the entire contents of which are incorporated herein by reference.

GOVERNMENT SUPPORT

This invention was made with Government support under Contract No. 80NSSC19C0432 awarded by NASA. The Government has certain rights to the invention.

BACKGROUND OF THE DISCLOSURE

In recent years, the number of satellites being sent into low earth orbit (LEO) has increased exponentially. Typically, satellite owners and operators, which may be the same entity, create a schedule for contacting satellites using a custom scheduler. The schedule that is created indicates when a satellite operator can access an antenna of a satellite ground station to provide data to the satellites, monitor the health of the satellites, retrieve data from the satellite, or perform other tasks. Some available schedulers require a specific task request to be input for each satellite, which can limit the ability to optimize tasks across a system of satellites and satellite ground stations. That is, such schedulers are not able to harness a client's goals, and therefore are unable to customize a schedule for each client of the system, particularly at scale.

SUMMARY OF THE DISCLOSURE

The following is a non-exhaustive listing of some aspects of the present techniques. These and other aspects are described in the following disclosure.

In some embodiments, data including one or more targets for accessing a satellite constellation may be obtained. Based on the data, a set of representations including parameters tuned to characterize the one or more targets may be generated, and candidate satellite constellation access programs may be determined based on the set of representations. For each satellite constellation access program, a first score may be computed for each target to obtain a first set of scores, and a second score may be computed for each first score of the first set of scores to obtain a second set of scores. Each first score may indicate a level of compliance associated with a given candidate satellite constellation access program. Each second score may be computed based on a weight associated with a corresponding target. A satellite constellation access program may be selected from the candidate satellite access programs based on the second set of second scores.

Various other aspects, features, and advantages of the present application will be apparent through the detailed description and the drawings attached hereto. It is also to be understood that both the foregoing general description and the following detailed description are examples and not restrictive of the scope of the present application.

BRIEF DESCRIPTION OF THE FIGURES

The methods, systems, and programming described herein are further described in terms of exemplary embodiments. These exemplary embodiments are described in detail with reference to the drawings. These embodiments are non-limiting exemplary embodiments, in which like referenced numerals represent similar structures throughout several views of the drawings, and wherein.

DETAILED DESCRIPTION OF THE DISCLOSURE

Figure 1:
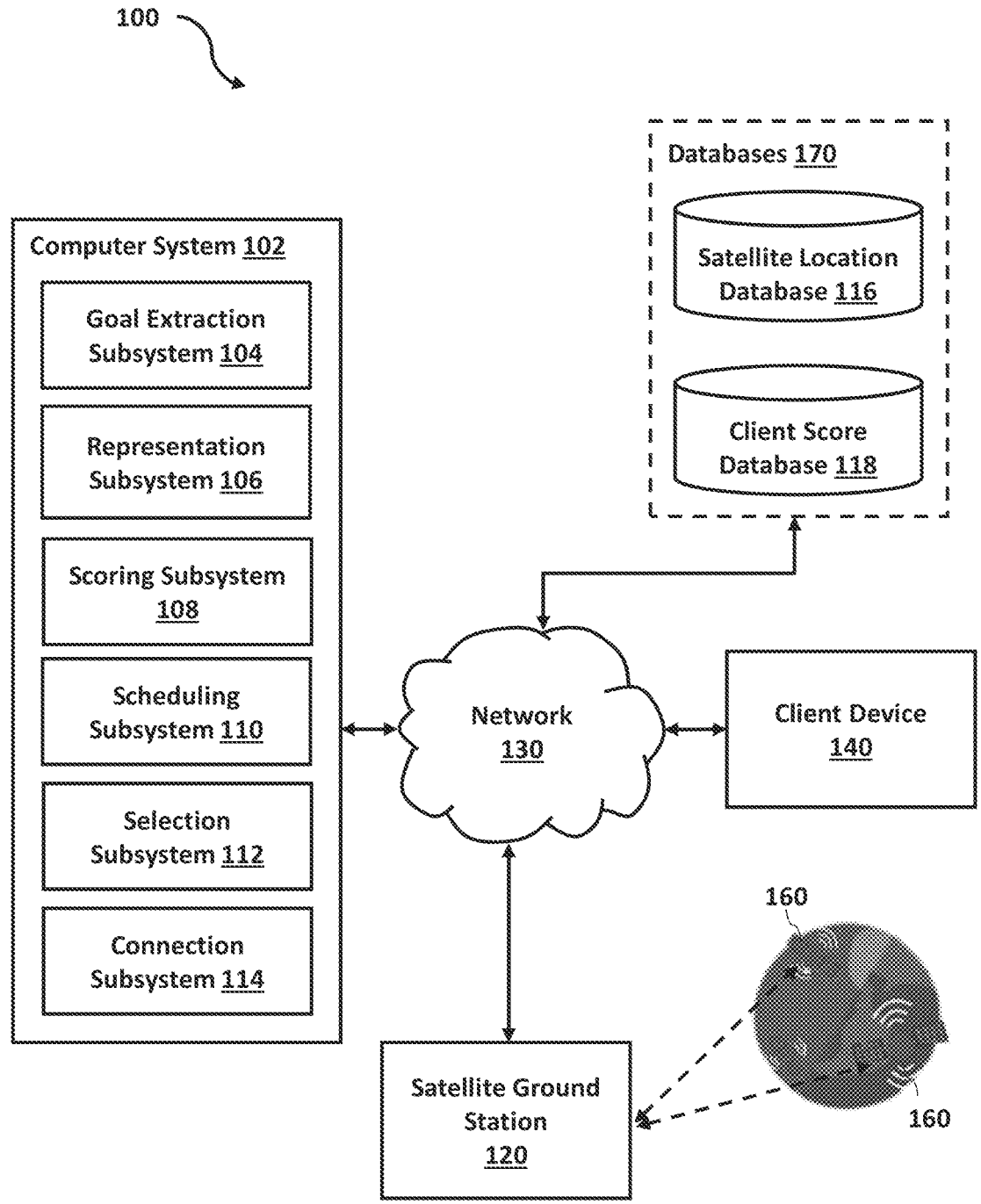
FIG. 1 is an illustrative diagram of an exemplary system for generating a satellite constellation access program for satellite communications, in accordance with various embodiments.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

There are thousands of satellites orbiting the Earth currently. Data signals transmitted from/to satellites may be received by antennae located on Earth. Such antennae may be part of a satellite dish. A satellite dish may include an antenna and can often be located at a "satellite ground station." A satellite ground station, as described herein, is a facility that includes one or more satellite dishes capable of communicating with one or more satellites in orbit. Satellite ground stations may also be referred to herein interchangeably as "ground stations" or "ground sites." Each satellite ground station may include hardware to control operations of the satellite ground station, the satellite dish, and communications into and out of the satellite ground station. One hardware component may be a communications device. For example, the communications device may be a satellite modem that receives data signals transmitted from a satellite to a satellite dish located at a satellite ground station. In some embodiments, the communications device may be integrated into or communicatively coupled with one or more computing devices or systems.

In some embodiments, the communications device (e.g., a satellite modem) may be configured to transform received data signals into a format communicable by a client device. This may include converting data signals from a satellite associated with a space-based communications network to data signals understandable by one or more terrestrial-based communications networks. For example, a communications device may transform an input data signal including data encoded using one or more space-based communication protocols into a data signal including data encoded using one or more terrestrial-based communication protocols (e.g., IPv4).

In order for a client device to obtain data from a satellite and/or provide instructions to a satellite, the client device may connect to a communications device at a satellite ground station whose satellite dish is able to communicate with the satellite. In some embodiments, a client device may be configured to connect to multiple communications devices each associated with a same or different satellite ground station in order to communicate with one or more satellites during each satellite's orbit. Furthermore, in some embodiments, a communications device may be configured to connect to and receive data signals from multiple satellites, each of which may be associated with a same or different space-based communications network.

A satellite may be part of a satellite constellation, which refers to a group of satellites that work together to provide coverage to a large portion of the globe. Some satellite constellations provide services, such as Internet access, telephone, navigation, communications, or other services. For example, a satellite constellation may facilitate a space-based communications network and include a unique set of space-based communications protocols. In some embodiments, the satellites may be low earth orbit (LEO) satellites, which typically orbit at less than 2,000 kilometers above the Earth's surface. A satellite may transmit data signals to one or more satellite ground stations, which may receive the data signals via a corresponding satellite dish. Additional details related to satellite communications are described in U.S. patent application Ser. No. 16/663,990, entitled "System and Method for Configuring a Communications Device for Space-Terrestrial Communications," filed on Oct. 25, 2019, the disclosure of which is incorporated herein by reference in its entirety.

Throughout the course of a day, different satellite ground stations may be capable of receiving data signals from different satellites based on each satellite ground station's geographical location, positioning, elevation, atmospheric conditions, or other factors. In some embodiments, a database may store satellite positioning and orbital trajectories for various satellites, which may be computed in advance, so that a particular satellite ground station's computer system can determine when a particular satellite will be within communication range (e.g., line of sight) of one or more satellite dishes located at that satellite ground station. For example, during a first time period (e.g., 12:00 AM-1:00 AM EST), a first satellite may be capable of transmitting data signals to a satellite dish located at a satellite ground station, while a second satellite may be capable of transmitting data signals to the same satellite dish during a second time period (e.g., 2:00 AM-3:00 AM EST). As another example, during the first time period, two different satellites may be capable of transmitting their data signals to the satellite dish located at the satellite ground station. The two satellites may be associated with the same space-based communications network, and thus may have the same space-based communication protocols, or the two satellites may be associated with different space-based communications networks. Additional details related to determining orbital paths of satellites, accounts that are authorized to access communications from satellites at different times, how to determine whether an account is authorized to access communications from a satellite, and/or satellite ground stations that are capable of receiving/transmitting communications to/from satellites at the different times are described in U.S. patent application Ser. No. 16/290,734, entitled "System and Method for Authorizing Access in Satellite Communications," and filed on Mar. 1, 2019, the disclosure of which is incorporated herein by reference in its entirety.

Described herein are technical solutions to overcome technical problems related to generating satellite constellation access programs for accessing satellites of a satellite constellation at scale. In particular, the technical solutions described herein allow clients to define their goals with respect to accessing a satellite constellation and obtain a satellite constellation access program that customizes each client's goals, and accounts for the importance of each particular goal to provide a suitable and efficient satellite constellation access program. Based on each client's goals and pre-computed satellite visibility information, a satellite constellation access program for accessing a given satellite constellation may be produced.

In some embodiments, satellite constellation access requests, which are also referred to herein as "requests" or "client goals," may include one or more satellite constellation access requirements and satellite constellation access targets. Satellite constellation access requirements are also referred to herein interchangeably as "requirements," "access requirements," or "hard constraint goals." Satellite constellation access targets are also referred to herein interchangeably as "targets," "access targets," "conditions," or "soft constraint goals." In some embodiments, satellite constellation access requirements describe constraints that permit a client to access to a satellite constellation. For example, the client may indicate that access to the satellite constellation is needed at least once per day. A hard constraint goal that is not satisfied renders contact with the satellite constellation useless. Satellite constellation access targets may refer to preferences of a client accessing the satellite constellation. For example, the client may indicate a preference for contacts with the satellite constellation to last 8 minutes, however contacts lasting 6 minutes are acceptable. Satellite constellation access targets may be partially, fully, or not, satisfied, and the degree with which a given satellite constellation access targets is satisfied may be measured via a utility function.

In some embodiments, the utility function is a representation of a client's preference for contacting the satellite constellation. Each utility function can also be described as a model representing a client's preference for contacting a satellite constellation. Utility functions may be selected, by the client or by the system, based on each client's particular goals. The utility functions may be modified via tunable parameters to be tailored to the client's goals. For instance, a shape and an offset of the utility function may be modified by varying or tuning a value for each of the parameters.

Various types of utility functions that may be used to represent satellite constellation access requests include logistic functions, Gaussian functions, truncated Gaussian functions, half-life (e.g., decay) functions, step functions, or others.

In some embodiments, a quality of service (QoS) metric may be computed based on the utility functions used to represent the satellite constellation access requests to indicate how satisfied a client is with the results of a given satellite constellation access program. The QoS metric is also referred to herein interchangeably as a "quality metric" or "quality score." Using the prior example of a client indicating a preference for contacts with a satellite constellation to last 8 minutes, but indicating that contacts lasting 6 minutes are also acceptable, if a given satellite constellation access program is generated that has the client contacting the satellite constellation for 8 minutes, the QoS metric may have a high value. For instance, the previously mentioned scenario may have a QoS=1.0, indicating 100% or full satisfaction of a client preference. Contacts for less than 8 minutes, in this example, may yield lower values for the QoS metric. For instance, a contact of 6 minutes may have a QoS=0.8, indicating 80% or partial satisfaction of the client preference. Depending on how frequently the scheduling system generates satellite constellation access programs for a client that have low QoS metric values, a boosting factor may be applied to the client.

The boosting factor, which may also be referred to herein as a "buoyancy factor" or "buoyancy," may boost (e.g., increase) a weight associated with a given client's goals to improve that client's QoS score. For example, if two clients each have satellite constellation access requests that conflict with one another (e.g., both clients seek to access the satellite network during a same temporal interval), then depending on each client's boosting factor, a resolution to the conflict may be determined. The boosting factor for a client may be computed based on prior values of the QoS metric values for that client for previous client goals. For instance, if a client has recently received unfavorable QoS scores, then the boosting factor for that client may be generated to increase the likelihood of the client receiving a favorable QoS score. Some embodiments may include the boosting factor being a weight applied to a client goal, which may be used as an input when determining a satellite constellation access program for contacting a satellite constellation.

FIG. 1 is an illustrative diagram of an exemplary system for generating a satellite constellation access program for satellite communications, in accordance with various embodiments. In some embodiments, system 100 may include computer system 102, satellite ground station 120, client device 140, databases 170, and satellites 160. Computing system 102, satellite ground station 120, and client device 140 may communicate with one another via network 130. Although a single instance of computing system 102, satellite ground station 120, and client device 140 are represented within system 100, multiple instances of computing system 102, satellite ground station 120, and/or client device 140 may be included, and the single instance of each instance of computing system 102, client device 140, and satellite ground station 120 is to minimize obfuscation within FIG. 1. For example, system 100 may include multiple satellite ground stations, multiple client devices, multiple computer systems, or other components.

Each of satellites 160 may be in low Earth orbit (e.g., less than 2,000 km above the Earth's surface), however some may be at greater distances (e.g., greater than 2,000 km). Depending on the particular distance from the Earth's surface, each of satellites 160 may have a different periodicity with which a complete orbit is made. Furthermore, the orbital path of each of satellites 160 may vary. In some embodiments, satellites 160 may form, or form part of, a satellite constellation. The satellite constellation may provide services to terrestrial-based devices. For example, the satellite constellation may provide navigation services to client device 140. However, other services may additionally or alternatively be provided (e.g., Internet services, telephone services, military-related services, etc.).

Satellite ground station 120 may include one or more satellite dishes or receivers configured to detect data signals incoming from satellites in LEO (e.g., satellites 160). Depending on the line of sight of the satellite ground station, different satellites may be capable of sending/receiving data signals to/from the satellite ground station. Similarly, depending on the line of sight of the satellite, different satellite ground stations may be capable of sending/receiving data signals from the satellite. Some satellites may have orbital trajectories that never coincide with a particular ground station's line of sight. Therefore, entities operating/owning satellites, such as corporations, governments, and research facilities, may construct satellite ground stations at strategic locations so that their satellites will be accessible.

Network 130 may be a terrestrial-based communications network including one or more Internet Service Providers (ISPs). Each ISP may be operable to provide Internet services, telephonic services, and the like, to one or more client devices, such as client device 140. In some embodiments, network 130 may facilitate communications via one or more terrestrial-based communication protocols, such as those mentioned above (e.g., TCP/IP, HTTP, WebRTC, SIP, WAP, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS 136/TDMA, iDen, LTE or any other suitable cellular network protocol), infrared, BitTorrent, FTP, RTP, RTSP, SSH, and/or VOIP.

Client device 140 may be capable of sending and receiving data signals to/from other client devices via network 130 as well as, or alternatively, a space-based communications network. Client device 140 may include one or more processors, memory, communications components, and/or additional components (e.g., display interfaces, input devices, etc.). Client device 140 may include any type of mobile terminal, fixed terminal, or other device. By way of example, client device 140 may include a desktop computer, a notebook computer, a tablet computer, a smartphone, a wearable device, or other client device. Users may, for instance, utilize client device 140 to interact with one another, one or more servers, or other components of system 100.

Computer system 102 may include one or more subsystems, such as goal extraction subsystem 104, representation subsystem 106, scoring subsystem 108, scheduling subsystem 110, selection subsystem 112, connection subsystem 114, or other subsystems. Computer system 102 may include one or more processors, memory, and communications components for interacting with different aspects of system 100. In some embodiments, computer program instructions may be stored within memory, and upon execution of the computer program instructions by the processors, operations related to some or all of subsystems 104-114 may be effectuated.

In some embodiments, goal extraction subsystem 104 may be configured to receive client data from clients and extract satellite constellation access requests from the client data. For example, client device 140 may provide, via network 130, client data to computer system 102. The client data may include satellite constellation access requests for a particular client associated with client device 140, or a client using client device 140 as an input device for inputting their satellite constellation access requests to computer system 102. As an example, with reference to FIG. 2, client device 140 may display user interface (UI) 210 on display screen 200. Clients may input goals for contacting a satellite constellation via UI 210. In some embodiments, UI 210 may include a first section 220 for inputting satellite constellation access requirements and a second section 230 for inputting satellite constellation access targets.

Figure 2:
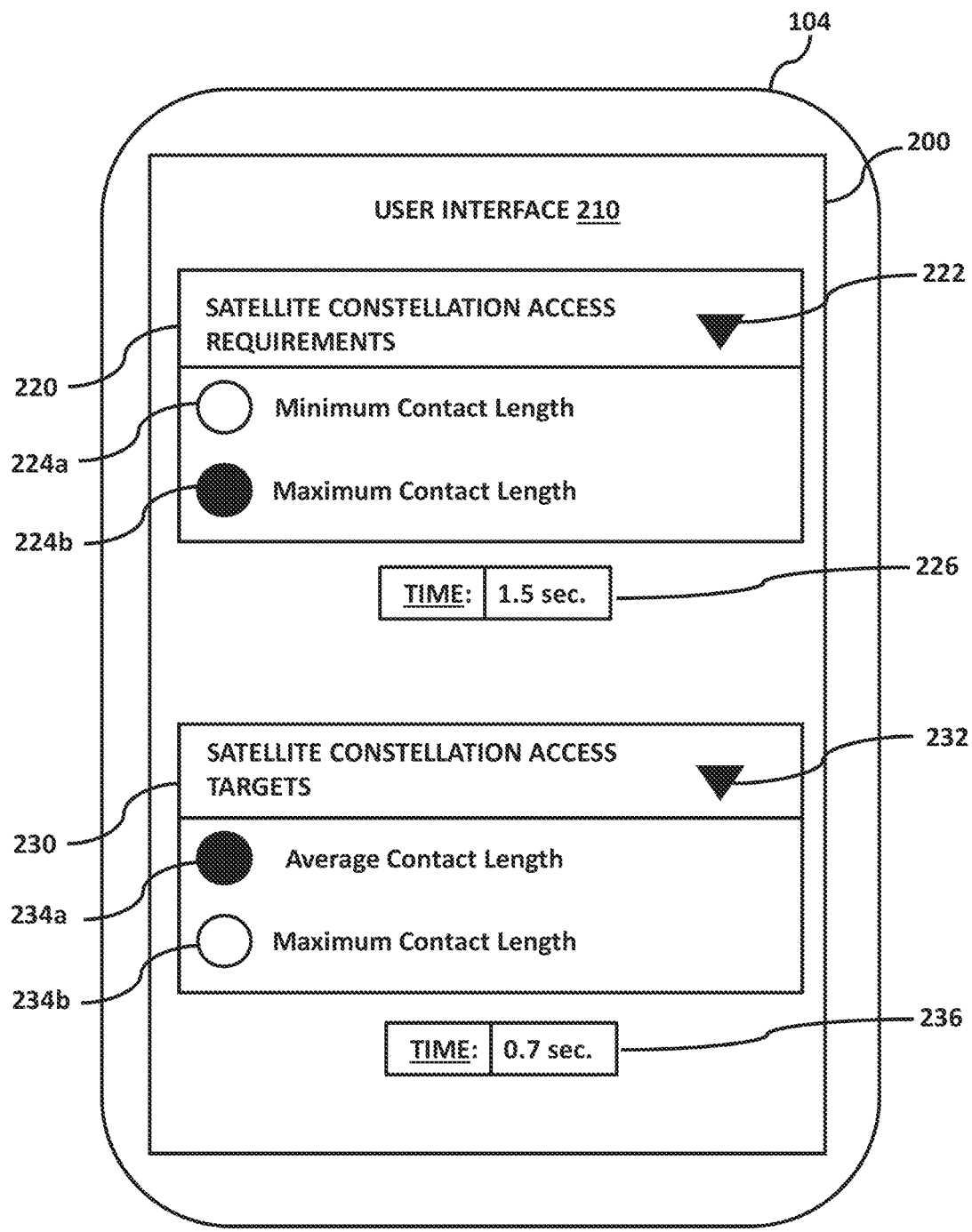
FIG. 2 is an illustrative diagram of a user interface for providing satellite constellation access requests, in accordance with various embodiments.

First section 220 may include an icon 222 that, if invoked (e.g., via a touch event, mouse click, etc., or hovering), renders a drop-down menu of available satellite constellation access requirements that a client may select. For instance, invoking icon 222 may cause options 224a and 224b to be displayed, respectively corresponding to a minimum contact length and a maximum contact length. As seen in FIG. 2, a client may select option 224b indicating that one of the client's satellite constellation access requirements is a maximum contact length. In some embodiments, selection of one of options 224a and 224b may cause input interface 226 to be rendered or, alternatively, if already rendered, may cause input interface 226 to allow inputs. A client may input parameter values associated with a selected hard constraint goal via input interface 226. In the illustrative example, where option 224b for maximum contact length is selected, the client may input a value for the maximum contact length (e.g., Time: 1.5 seconds).

While UI 210 displayed two options for satellite constellation access requirements that a client may provide to computer system 102, additional or alternative satellite constellation access requirements may be presented to the client via UI 210. Some examples of satellite constellation access requirements that a client may select include, but are not limited to (which not to imply that other lists are limited), minimum contact length, maximum contact length, minimum elevation, maximum contact count, contact blackout periods, sun only, eclipse only, external exclusion call, or others. Table 1 provides a listing of the aforementioned example satellite constellation access requirements, a description of each hard constraint goal, and a parameter that may be used to describe a corresponding hard constraint goal.

TABLE 1

| Satellite Constellation Access Requirement | Description | Parameter(s) |
|---|---|---|
| Minimum Contact Length | A minimum amount of time that a client is to access a satellite network | Time (seconds, minutes, hours) |
| Maximum Contact Length | A maximum amount of time that a client is to access a satellite network | Time (seconds, minutes, hours) |
| Minimum Elevation | A minimum elevation for a satellite to be contacted | Distance (feet, yards, miles, meters, kilometers) |
| Maximum Contact Count | A maximum amount of contacts with a satellite constellation per day | Rationale Number |
| Contact Blackout Periods | Time intervals when no contact with a satellite constellation is to be made | Time Intervals (seconds, minutes, hours) |
| Sun Only | Contact with a satellite constellation is only to be made during sun exposure due to spacecraft thermal constraints | Time Intervals (seconds, minutes, hours) |
| Eclipse Only | Contact with a satellite constellation is only to be made during eclipses due to thermal reasons | Time Intervals (day/month/year, seconds, minutes, hours) |
| External Exclusion Call | Time intervals when contact with a satellite constellation is not to occur during | Time Intervals (day/month/year, seconds, minutes, hours) |

In some embodiments, clients may need to provide at least one satellite constellation access requirement in order for computer system 102 to generate a valid satellite constellation access program for the client. The satellite constellation access requirements may serve as filters for satellite constellation visibilities. Given all visibilities of all satellites in a satellite constellation, the satellite constellation access requirements may filter out visibilities that do not meet those requirements. For example, if a particular satellite in the satellite network is only visible from a satellite ground station during the times 0:00-6:00, and a minimum contact length needed is 8 hours, then the satellite may be removed as an option to access when producing a satellite constellation access program for the client.

Second section 230 may include an icon 232 that, if invoked (e.g., via a touch event, mouse click, etc., or hovering), renders a drop-down menu of available satellite constellation access targets that a client may select. For instance, invoking icon 232 may cause options 234a and 234b to be displayed, respectively corresponding to an average contact length and a maximum contact length. As seen in FIG. 2, a client may select option 234a, indicating that one of the client's satellite constellation access targets is average contact length. In some embodiments, selection of one of options 234a and 234b may cause input interface 236 to be rendered or, alternatively, if already rendered, may cause input interface 236 to allow inputs. A client may input parameter values associated with a selected soft constraint goal via input interface 236. In the illustrative example, where option 234a for average contact length is selected, the client may input a value for the average contact length (e.g., Time: 0.7 seconds).

While UI 210 displayed two options for satellite constellation access targets that a client may provide to computer system 102, additional or alternative satellite constellation access targets may be presented to the client via UI 210. Some examples of satellite constellation access targets that a client may select include, but are not limited to (which not to imply that other lists are limited), average contact length, maximum contact length, distributed contacts, condensed contacts, sun contacts, eclipse contacts, data value by region, external goal call, contact time per data, contact count per data, maximum time between contacts, or others. Table 2 provides a listing of the aforementioned example satellite constellation access targets, a description of each soft constraint goal, and a parameter that may be used to describe a corresponding soft constraint goal.

for satellite constellation access targets based on the satellite constellation access requests provided by the client. In some embodiments, the representations may express the clients' preferences in a manner capable of being input into a computer-based scheduling system for generating candidate satellite constellation access programs and selecting a satellite constellation access program. As mentioned above, and seen in Table 2, the satellite constellation access

TABLE 2

| Satellite Constellation Access Targets | Description | Parameter(s) |
|---|---|---|
| Average Contact Length | A targeted average amount of time that a satellite constellation is to be contacted | Time (seconds, minutes, hours) |
| Maximum Contact Length | A preferred amount of time that a satellite constellation is to be contacted | Time (seconds, minutes, hours) |
| Distributed Contacts | A preference for contacts spread throughout the day | Time Intervals (seconds, minutes, hours) |
| Condensed Contacts | A preference for contacts to be clustered together | Time Intervals (seconds, minutes, hours) |
| Sun Contacts | A preference for contacting the satellite constellation during sun exposures | Time Intervals (seconds, minutes, hours) |
| Eclipse Contacts | A preference for contacting the satellite constellation during eclipses | Time Intervals (day/month/year, seconds, minutes, hours) |
| Data Value by Region | Geojson file describing areas of interest and a weight associated with each area of interest | Longitude/Latitude |
| External Goal Call | Enables clients to provide an API that accepts a time query and respond with a 0 or 1 | 0 or 1 |
| Contact Time Per Day | A targeted time per day for contacting a satellite constellation | Time Intervals (seconds, minutes, hours) |
| Contact Count Per Day | A targeted number of contacts with a satellite constellation per day | Rationale Number |
| Maximum Time Between Contacts | A preference for a maximum amount of times between each contact with a satellite constellation | Time Intervals (seconds, minutes, hours) |

Depending on a driving influence of the client (e.g., military, business, scientific, etc.), the satellite constellation access targets may vary. In some embodiments, the satellite constellation access targets may be metadata supporting the client's objectives. Computing system 102, which may generate satellite constellation access programs for contacting satellite constellations for clients, may seek to get as close to each satellite constellation access target as possible while balancing all client needs.

In some embodiments, a client may provide the satellite constellation access requests via plain text, speech, or other means. For example, the client may send a plain text message indicating one or more satellite constellation access requirements and satellite constellation access targets to computer system 102. Computer system 102 may include natural language processing functionality to parse and extract contextual information from the plain text, which may then be used to determine an intent or intents of the client. As another example, the client may provide audio data representing a message to computer system 102. Computer system 102 may include speech recognition functionality in addition to natural language processing functionality, which may transform the audio data into text data, and may subsequently determine one or more intents of the client from the text data. In some embodiments, the client data may be encrypted, and computer system 102 may be configured to decrypt the client data prior to extracting the request.

In some embodiments, representation subsystem 106 may be configured to identify, select, and generate representations for satellite constellation access requests. For example, representation subsystem 106 may generate representations requests may include various satellite constellation access targets, which may be tuned specifically to the needs of each client. In some embodiments, each representation may include configurable parameters that may be tuned based on the client's satellite constellation access targets. The representations, for instance, may be models described by the configurable parameters, which may be refined and modified based on feedback information. Different representations may be used to characterize different client satellite constellation access targets. A representation of a client goal, as referred to herein, may also be described, interchangeably, with a "utility function." A utility function corresponds to a mathematical representation, model, or description, of a client goal having a formulaic expression tuned based on the specifics of the client goal. Various different types of utility functions may be used including, but not limited to (which is not to imply that other lists are limiting), a logistic function, a Gaussian function, a truncated Gaussian function, a half-life function, or other functions.

Figure 3A:
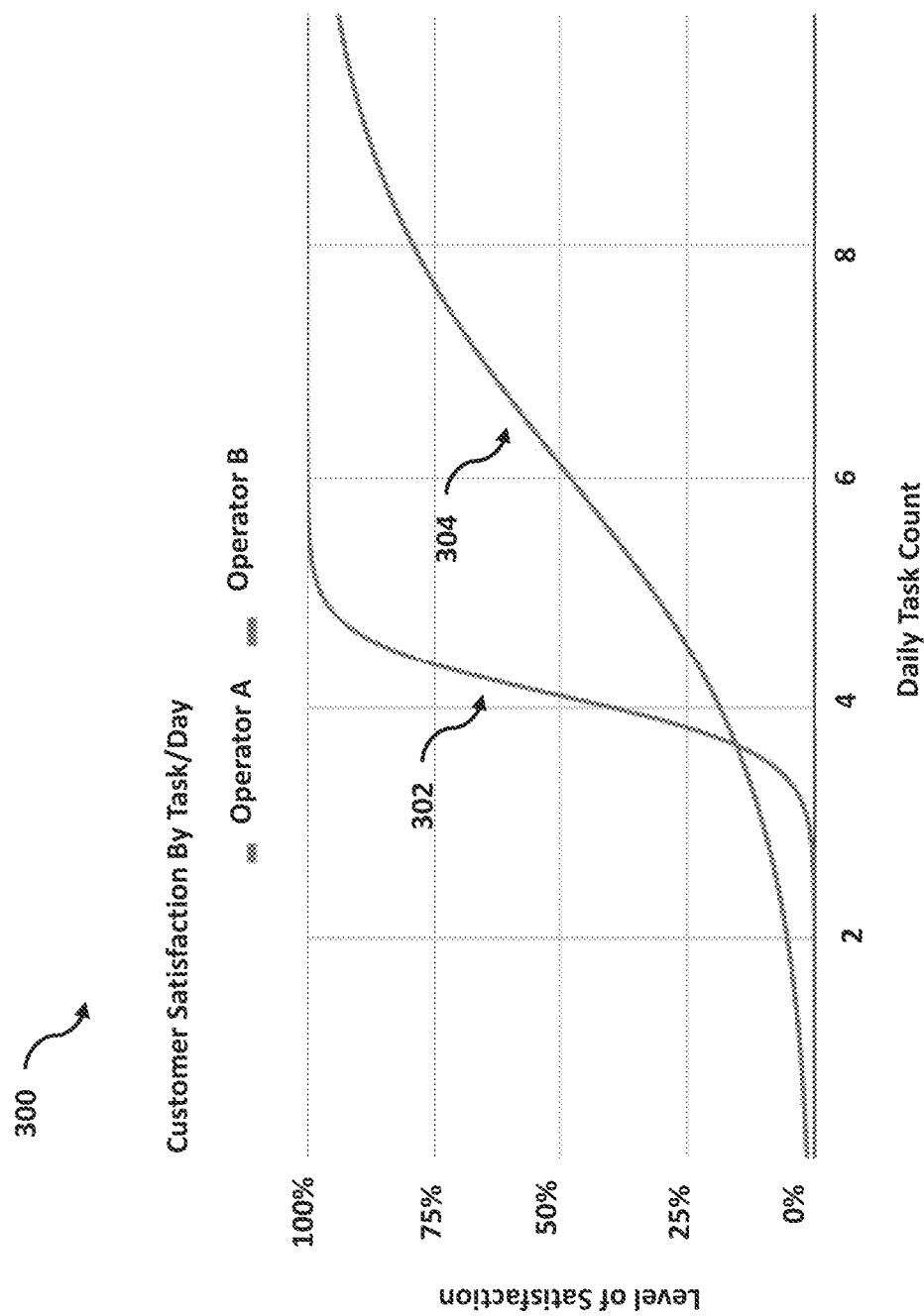
FIGS. 3A-C are illustrative diagrams of various utility functions representing satellite constellation access requests, in accordance with various embodiments.

With reference to FIG. 3A, a graph 300 includes a depiction of a first representation 302 of a satellite constellation access target for a first client, as well as a second representation 304 of a satellite constellation access target for a second client. The satellite constellation access target of both the first client and the second client, in the example, represents a number of contacts per day with a satellite constellation. For example, the satellite constellation access target of the first client indicates a preference of between 3 and 6 contacts per day with the satellite constellation, while the satellite constellation access target of the second client indicates a preference for more than 6 contacts per day with the satellite constellation. Based on the satellite constellation access target of the first client, in some embodiments, a logistic function may be selected as a utility function to represent the first client's preferences with respect to the number of contacts per day. Similarly, based on the satellite constellation access target of the second client, a logistic function may also be selected as a utility function to represent the second client's preferences with respect to number of contacts per day.

The logistic function may include two parameters—shape and offset—that can be tuned based on a client's particular satellite constellation access target. As an example, the logistic function may be represented by Equation 1:

$$f(x) = \frac{1}{1 + e^{-k(x-\delta)}}.$$ Equation 1

In Equation 1, k represents the steepness or shape of the curve, while δ represents the offset.

First representation 302, which relates to the satellite constellation access target for the first client (e.g., preference of between 3 and 6 contacts per day), shows a relatively large value for k and an offset of approximately 4.5. In other words, first representation 302 conveys that the first client finds no value in having less than 3 contacts per day with the satellite constellation, and achieves no increase in value for more than 6 contacts per day (i.e., anything more than 6 contacts per day provides no additional value). Additionally, the first client's satisfaction with a satellite constellation access program for accessing the satellite constellation increases sharply from 3 contacts per day (greater than 0% satisfaction) to 6 contacts per day (approximately 100% satisfaction).

Second representation 304, which relates to the satellite constellation access target of the second client (e.g., preference of more than 6 contacts per day with the satellite constellation but having some value in less contacts), shows a relatively small value for k and an offset of approximately 6. In other words, second representation 304 conveys that the second client finds some value in any number of contacts with the satellite constellation, but has more satisfaction with 6 or more contacts. Additionally, the second client will continue taking more contacts (e.g., greater than 6) with increasing satisfaction if allotted.

In some embodiments, a client may provide their client data including their satellite constellation access targets to computer system 102. The client data may include an indication of a preferred representation for a particular satellite constellation access target (e.g., a logistic function for a number of contacts per day), and may also indicate parameters for the representation. For example, the client data may include a selection of a logistic function to represent a particular client goal as well as parameters for the selected logistic function. In some embodiments, representation subsystem 106 may select a representation for a client based on the client data provided to computer system 102. For example, if the client data indicates that the client prefers between 3 and 6 contacts per day, with 3 being a minimum number of contacts per day and more than 6 contacts providing no additional benefit, then representation subsystem 106 may select the logistic function from a plurality of possible utility functions to represent the particular client goal and may select initial values for the parameters defining the representation. In some embodiments, upon representation subsystem 106 selecting the utility function and generating the representation based on the satellite constellation access targets, computer system 102 may provide the representation to the client (e.g., via client device 140). The client may then modify, or provide feedback to cause modifications to be performed to, the values for the parameters. For example, the client may provide feedback to cause a different utility function (e.g., a different representation) to be selected, modify a value associated with the utility function (e.g., change a value for the bias of a logistic function), or confirm the utility function and/or the values of the parameters.

In some embodiments, different utility functions may be used for different satellite constellation access targets. The particular utility function that is used may be selected from a plurality of possible utility functions based on the particular constraint being represented and the satellite constellation access requests. Some examples of utility functions that may be used include, but are not limited to, (not to imply that other lists are limited), Gaussian functions, truncated Gaussian functions, half-life functions, or other functions.

Figure 3B:
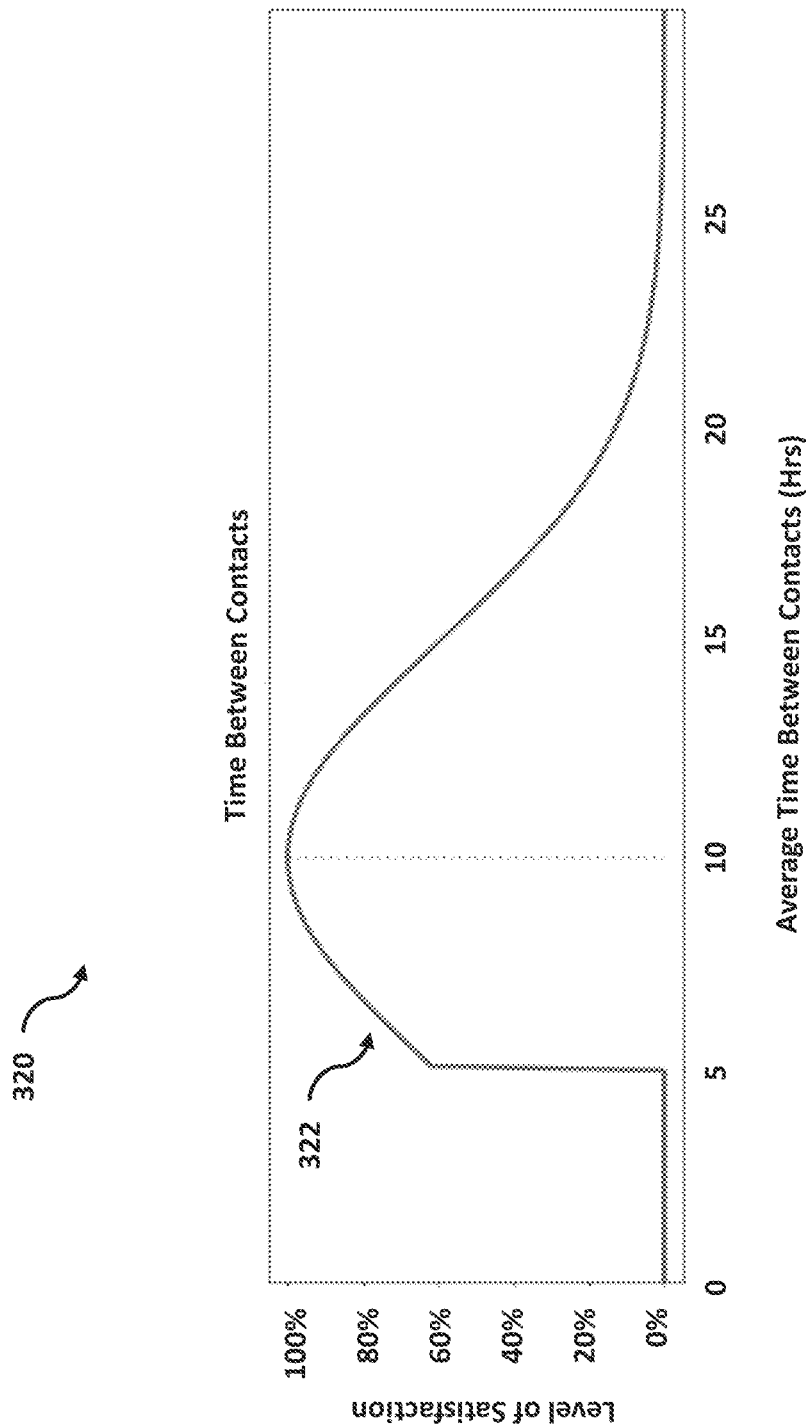

FIG. 3B depicts a graph 320 including a representation 322 describing a truncated Gaussian function that may be used for a utility function characterizing a client goal. A Gaussian function, also referred herein to interchangeably as a "Gaussian distribution," or "Normal distribution," is described by Equation 2:

$$f(x) = \frac{1}{\sigma\sqrt{2\pi}} e^{-\frac{1}{2}\left(\frac{x-\delta}{\sigma}\right)^2}$$ Equation 2

In Equation 2, σ is the standard deviation and δ is the mean of the distribution. A truncated Gaussian may have a portion of the distribution set to zero. For example, representation 322 is an example of a truncated Gaussian distribution where any value less than 5 is set to zero. A client goal described by a truncated Gaussian function (e.g., selected as a utility function for that goal) indicates that for certain values, no value is obtained. The truncated Gaussian function may be described by Equation 3:

$$f(x) = \begin{cases} \frac{1}{\sigma\sqrt{2\pi}} e^{-\frac{1}{2}\left(\frac{x-\delta}{\sigma}\right)^2}, & A \leq x \leq B \\ 0, & x < A \text{ or } x > B \end{cases}$$ Equation 3

In Equation 3, the bounds A and B may be specified by the client. For example, representation 322 may have A=5, while there may be no value specified for B.

The truncated Gaussian function may be applicable for describing satellite constellation access requests that have an optimal goal, a varying amount of satisfaction surrounding that goal, and no value for certain instances. For example, as seen with reference to FIG. 3B, a satellite constellation access target for an average amount of time between contacts with a satellite constellation may be 10 contacts per day, where less than 5 contacts per day provides no value to the client, some value is obtained if the values are between 5 and 15 contacts, and every contact in excess of 15 contacts provides negative value to the client. In this particular example, representation 322 may be selected to describe the satellite constellation access target.

Figure 3C:
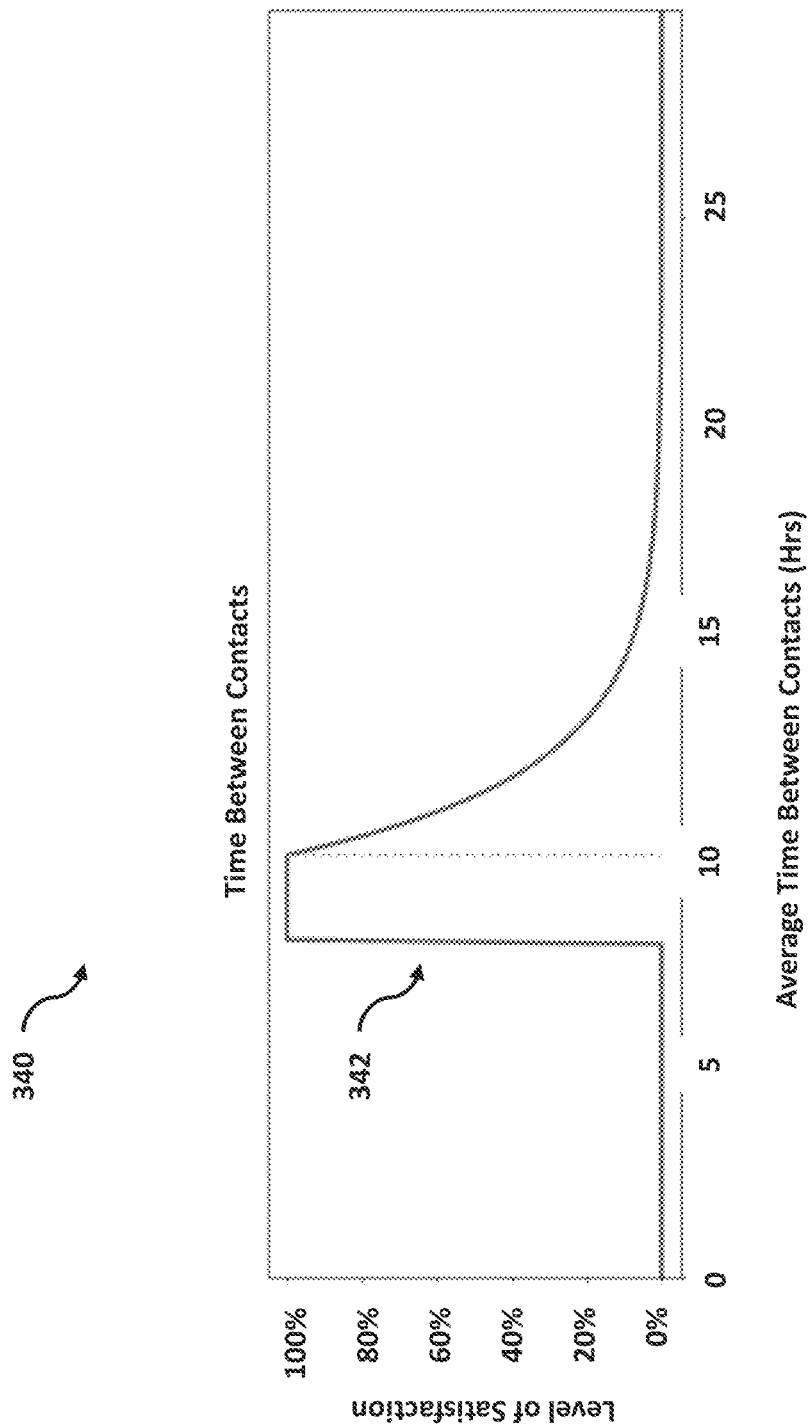

FIG. 3C depicts a graph 340 includes a representation 342 describing a half-life function that may be used for a utility function characterizing a client goal. The half-life function typically includes a region where maximum satisfaction is achieved for a particular value or set of values, and any value after (or before) the values yielding maximum satisfaction has a decreasing level of satisfaction. As an example, representation 342 may represent an average amount of time between contacts with a satellite. In particular, the client's satellite constellation access target may indicate that for having an average amount of time between 8 and hours between contacts is optimal, providing a maximum level of satisfaction. For average amounts of time between contacts that are less than 8 hours, no value is obtained (e.g., the level of satisfaction is 0%). For average amounts of time between contacts that are greater than 10 hours, the level of satisfaction decreases at a particular rate, which may be referred to as a decay rate, such that at some temporal value (e.g., 24 hours), no value is provided to the user (e.g., the level of satisfaction is 0%). The half-life function may be described by Equation 4:

$$f(x)=Ne^{-\lambda(x-\delta)} \qquad \text{Equation 4.}$$

In Equation 4, N is maximum satisfaction level (typically set to 1), $\lambda$ is the decay constant indicating how fast the function goes from N to 0, and $\delta$ represents the offset. Looking at representation 342, 8 hours$\leq\delta\leq$10 hours, indicating that any value of 6 between 8 hours and hours achieves maximum level of satisfaction for a particular satellite constellation access target of the client.

Depending on the parameter values selected, the representations may characterize different functions, such as a step function, a tangent function, a hyperbolic function, a Poisson distribution, a delta-function, or other functions.

In some embodiments, scoring subsystem 108 may be configured to compute a score indicating how well a satellite constellation access program aligns with a client's satellite constellation access targets. The score that is computed may be referred to herein interchangeably as a quality score, quality metric, or quality of service (QoS) score. When a satellite constellation access program for a client produces a high quality score for a particular satellite constellation access target, this may indicate that the particular client satellite constellation access target was satisfied by the satellite constellation access program. For example, if a client's satellite constellation access target indicates a preference of 8 contacts with a satellite constellation per day, and the generated satellite constellation access program for the client has 8 contacts per day, then the quality score may be high (e.g., a score of 100% or 1.0) indicating a high level of satisfaction with the generated satellite constellation access program. If the satellite constellation access program for a client produces a low quality score for a particular satellite constellation access target, this may indicate that the particular satellite constellation access target was not satisfied. Using the previous example, if the generated satellite constellation access program for the client has 1 contact per day with the satellite constellation, then the computed quality score may be low (e.g., 10% or 0.1) indicating a low level of satisfaction with the generated satellite constellation access program.

In some embodiments, each of the satellite constellation access requests may be assigned a weight, $w_i$. The weights may be assigned by the client, by computer system 102, or both, and each satellite constellation access requirement and each satellite constellation access target may be assigned a weight. The weights may be normalized such that, when summed, they equal 1.0. A quality score for a client for a given satellite constellation access program may be computed based on the weights assigned to each satellite constellation access requirement and satellite constellation access target. For example, referring to FIG. 3A, first representation 302 indicates that a satellite constellation access program that includes 6 contacts with a satellite constellation produces a quality score of 100% or 1.0 for a first client (e.g., operator A). On the other hand, second representation 304 indicates that a satellite constellation access program that includes 6 contacts with the satellite constellation produces a quality score of approximately 50% or 0.5.

Each satellite constellation access requirements may yield a quality score of 1.0 or 0.0, indicating complete satisfaction (e.g., 100% level of satisfaction) of a particular satellite constellation access target or complete non-satisfaction (e.g., 0% level of satisfaction) of the particular satellite constellation access target. If a satellite constellation access requirement receives a quality score of 0.0, then this indicates that a given satellite constellation access program is unacceptable to meet a client's requirements for satellite constellation access. Therefore, computer system 102 may be configured to generate satellite constellation access programs where each client's satellite constellation access requirements produce a quality score of 1.0. Each satellite constellation access target may have a quality score within a range of 0.0 and 1.0. The closer to 1.0 the quality score is for a given satellite constellation access requirement, the greater the total quality score will be for a given satellite constellation access program. In some embodiments, the total quality score may be computed based on Equation 5:

$$\text{TotalQoS}=\Sigma w_i \cdot s_i \qquad \text{Equation 5.}$$

In Equation 5, $w_i$ represents a weight associated with an i-th client goal and $s_i$ represents a quality score for the i-th satellite constellation access requirement or satellite constellation access target.

In some embodiments, recent performance data including previous quality scores for a client may be retrieved from client score database 118 prior to computer system 102 generating satellite constellation access programs for satellite constellation access. For example, quality scores for a past N satellite constellation access programs (e.g., total quality score and/or individual quality scores for each requirement/target) may be retrieved from client score database 118. Some embodiments include selecting an N most recent satellite constellation access programs for a client. For example, the past 5 or more satellite constellation access programs, 10 or more satellite constellation access programs, 20 or more satellite constellation access programs, etc., may be retrieved for a given client. Some embodiments include selecting satellite constellation access programs generating for the client in a last N days. For example, satellite constellation access programs generated within the last 1 or more days, 7 or more days, 14 or more days, 30 or more days, etc., may be retrieved for a given client.

In some embodiments, a client account with computer system 102 (e.g., a client of a satellite constellation scheduling system) may have a client score computed based on the client's previous quality scores. Each time a new satellite constellation access program is generated for the client, a client score for that client may be updated to reflect improvements or diminishments to the client score.

In some embodiments, previous quality scores for a client may be used as an input when determining candidate satellite constellation access programs for the client. For instance, if a client recently has received satellite constellation access programs that produced poor quality scores, lowering a value of the client score for that client, computer system 102 may be configured to apply a boosting factor to increase the likelihood of the client's next satellite constellation access program yielding a high quality score, thus raising the client score. For example, if a client score for a particular client is low, then a boosting factor may be applied to the client's account such that the client receives preferential treatment when the computer system 102 determines whether to allocate a time interval for satellite constellation access to the client or to a different client that has a higher client score.

Application of a boosting factor to a client's account when generating satellite constellation access programs may assist in resolving scheduling conflicts. For instance, if two clients submit satellite constellation access requests that indicate both seek to contact a satellite constellation during a same temporal interval, computer system 102 can either partially satisfy the two users by giving each some of the desired temporal interval for accessing the satellite constellation, or computer system 102 can allocate the temporal interval to one client and thus deny the temporal interval to the other client. In some cases, a partially satisfied satellite constellation access target is still acceptable for a client. For example, if a client has a satellite constellation access target for an average contact time with a satellite of a satellite network to be minutes, but will accept anything greater than 10 minutes, then a satellite constellation access program allocating an average contact time of 15 minutes will partially satisfy the satellite constellation access target. However, continued or repeated allocation of satellite constellation access programs to a client having their satellite constellation access requests only partially met can lead to low user satisfaction with the satellite constellation scheduling system (e.g., computer system 102), and may cause clients to seek other services to obtain access to satellite constellations.

In some embodiments, a boosting factor may be introduced to balance out instances where a particular client continues to receive satellite constellation access programs producing low quality scores (as well as, or alternatively, high quality scores). The boosting factor may be a value between 0 and 1 indicating a degree with which a client deserves to have preferential treatment when scheduling satellite constellation access. When a client receives preferential treatment (i.e., the satellite constellation access target is satisfied), the client's corresponding boosting factor may be lowered, and vice versa in order to maintain balance. Some cases may include an oscillating pattern of the boosting factor raising and then decreasing over time in accordance with the client not receiving preferential treatment and receiving preferential treatment, respectively.

In some embodiments, the boosting factor, which may also be referred to herein interchangeably as a buoyancy score, may be computed for a client account or for a particular satellite. In the latter case, a particular satellite may receive a disproportionate amount of contacts when compared to other satellites, and the boosting factor may help ensure balanced load distribution amongst the other satellites.

In some embodiments, upon creation of a client account with computer system 102, the client account may be initialized with an initial value for a boosting factor. For example, the initial value of the boosting factor for a client may be any number before 0.0 and 1.0. In some cases, the initial value for the boosting factor may be 0.5. Some cases include the initial value for the boosting factor being 0.3 or 0.7. If a conflict is detected between two clients both attempting to access a same antenna system during a same temporal interval, scheduling subsystem 110 may determine the boosting factor for each client and apply the boosting factor to determine which client should be allocated the temporal interval. A given satellite ground station may have at least one antenna (e.g., satellite dish). One client may access the satellite ground station to communicate with a satellite using the antenna. In some embodiments, two or more clients may be able to communicate with two different satellites using a same antenna.

In response to resolving a conflict between two clients, the boosting factor for each client may be updated. As mentioned previously, each client goal (e.g., satellite constellation access requirements and/or satellite constellation access targets) may be associated with a corresponding weight, $w_i$. For each of the i satellite constellation access requests, a value $0 \leq p_i < w_i$ may be calculated to determine a degree to which the goal was partially satisfied. The updated boosting factor may be computed based on Equation 6:

$$K(t+1)=[K(t-1)+p_i]/2 \qquad \text{Equation 6.}$$

In Equation 6, K(t) represents the boosting factor for time t. For example, for t=0 (e.g., when a client account is created with computer system 102), K(t=0)=0.5. Thus, based on the computed value for $p_i$, an updated boosting factor may be computed based on the results of a most recently generated satellite constellation access program.

In some embodiments, the boosting factor may serve as a global parameter for scheduling subsystem 110 when computing satellite constellation access programs. For example, a single parameter in the range of 0.0 to 1.0 may express a degree with which scheduling subsystem 110 may be influenced by the boosting factor. In some cases, a boosting factor of 0.0 indicates no effect whereas a boosting factor of 1.0 may indicate that the boosting factor is the only factor when making scheduling decisions.

In response to two clients of a same tier competing for a same contact (e.g., a same temporal interval to access a particular satellite), scheduling subsystem 110 may be configured to retrieve the most recent boosting factors for each client account. For instance, the boosting factors for each client account of system 100 may be stored in client score database 118. In some cases, for the two clients of the same tier competing for the same contact, scheduling subsystem 110 may use the retrieved boosting factors for each client's corresponding account to perform Monte Carlo sampling to determine which client will "win" the conflicting contact.

Tier Boosting for Clients.

In some embodiments, a client may require guaranteed access to satellite ground stations in rare instance, whereas generally the client's requirements would not be as strict. This is one of the reasons why a large number of satellite ground stations may be built solely for use by one particular mission. Most of these satellite ground stations, due to the sparse and infrequent needs of the operators, rarely are used. Additionally, this issue can impact attracting lower tier clients to a network of satellite ground stations.

Some examples of events when a satellite operator may require dedicated satellite ground station (and satellite) access include, but are not limited to (which is not to imply that other lists are limiting), infrequent missions with short orbital durations (e.g., launches to the International Space Station), launch and early operation (LEOPs) support, responding to critical spacecraft anomalies, orbital maneuvers requiring supervision, major spacecraft events (e.g., solar array or instrument deployment), spacecraft flight software loads, missions dedicated to highly time-sensitive events (e.g., priority military operations, hurricane tracking, natural disaster response, etc.), or other events. In some cases, when dedicated access to a satellite ground station is needed, which can disrupt a satellite constellation access program, additional satellite ground stations may be used as alternative sites for providing satellite constellation access.

In some embodiments, clients may be provided with a mechanism for manually or automatically boosting, temporarily, their "tier" in order to meet the requirements of a particular mission. As described herein, a client's "tier" may correspond to a client's priority for being allocated access to a satellite constellation and/or a satellite ground station's antenna. As described herein, a "mission" may refer to a task or set of tasks that a client is to carry out when accessing a satellite constellation (e.g., retrieving data, performing experimentation, monitoring instruments, etc.).

Some embodiments include determining particular situations for which clients require a task to be performed. After determining these situations, the values for parameters of a utility function representing the satellite constellation access requests may be tuned to clearly represent the particular situations where the client requires access. In response to the utility function's parameters being accurately tuned, a quality metric threshold, which may also be referred to herein interchangeably as a "quality score threshold" or "quality threshold," may be set. If the client's corresponding quality score drops below the quality metric threshold, a tier boost may be applied. As an example, the quality score threshold may be a value between 0.0 and 1.0, such as 0.7, 0.8, or other values. In some embodiments, the quality score threshold may be predetermined based on historical quality scores of the client, other clients, or based on other criteria.

In some embodiments, tuning the parameter values for a utility function for tier boosts, determining the quality metric threshold, or both, may be an iterative process. For example, in response to an initial quality metric threshold being generated, one or more simulations may be executed to determine an estimated number of tier boosts a particular client is expected to request. The simulations additionally may enable estimations to be made on impacts to additional client satellite constellation access programs. After running the simulations, a determination may be made as to whether the initial quality metric threshold is too high or too low, indicating that the estimated needs of the client and/or impact on other customers based on the estimated number of tier boosts the client is expected to need. A revised quality metric threshold may then be determined and selected based on a comparison of the initial quality metric threshold and the revised quality metric threshold. This process may repeat a certain number of times (e.g., 5 or more iterations, 10 or more iterations, 100 or more iterations, etc.), until the revised quality metric threshold and a previous revised threshold are similar, such as a difference between the revised and the previous revised thresholds is less than a similarity threshold value (e.g., the difference is less than 1.0, less than 0.5, less than 0.1, less than 0.01, or less.

In some embodiments, scoring subsystem 108 and scheduling subsystem 110 may be configured to compute a quality score for a client for each of the one or more candidate satellite constellation access programs that have been generated. The computed quality score may be compared to a pre-determined quality metric threshold in order to determine whether to apply a tier boost and, in some embodiments, a value of the tier boost to be applied. If, based on the comparison, a determination is made that the client's quality score should be boosted, then the tier boost may be applied to the client's quality score, and the updated quality score may be used by scheduling subsystem 110 to generate one or more updated candidate satellite constellation access programs. This process may repeat until at least one of the updated quality scores for the client is greater than the quality metric threshold. In some embodiments, scheduling subsystem 110 may prevent tier boost from being applied. For example, if boosting a client's quality score causes other clients' quality scores to decrease (e.g., by more than a threshold amount, more than a threshold number of other clients, etc.), then no tier boost may be applied for that client.

In some embodiments, clients may acquire credits to facilitate having their quality score boosted. For example, a client may purchase, exchange, be awarded, or otherwise obtain the credits. Scheduling subsystem 110 may use credits to procure additional contacts with a satellite constellation, increasing or decreasing a number of contacts allocated to the client, and the like. In some embodiments, scoring subsystem 108 may be configured to determine a balance for a client, where the balance indicates an amount of credits a client has. Scoring subsystem 108 may also determine an amount of credits needed for the tier boost, and whether the client's balance of credits is enough for the tier boost. In some embodiments, a client may be notified if a credit balance is less than a threshold credit balance. The notification may indicate that the client needs to obtain additional credits. Some cases include the client's credit balance being automatically refilled upon being less than the threshold credit balance.

First Tier Boosting Example

In some embodiments, a first client provides client data to computer system 102 where the client data indicates that the first client requires access to a satellite constellation during certain weather events (e.g., tropical storms, hurricanes, etc.). During such events, the first client may provide configuration files (e.g., geojson files) defining particular geographical regions to be monitored. The values associated with these geographical regions may be boosted during these times such that if the first client's is unable to obtain access to the satellite constellation when coverage is available for these geographical regions, the first client's quality score may decrease. If the first client's quality score decreases past a quality metric threshold for the first client, then computer system 102 may apply a tier boost to the first client's quality score and may try to recompute satellite constellation access programs for the first client (as well as other clients) based on the updated quality score of the client. Additionally, as a result of the tier boost, some of the first client's credits may be consumed. In some embodiments, other clients whose quality scores decrease as a result of the first client's improved quality score, and thus improved satellite constellation access program, may have their boosting factor increased to compensate for the decrease. Thus, the tier boost and the boosting factor can work in tandem to keep balance in the satellite constellation access programs for all clients of system 100.

Second Tier Boost Example

In some embodiments, a second client may have a spacecraft, and requires confirmation that the spacecraft is in a safe orientation as fast as possible to prevent instrument damage. The second client may provide status information related to the spacecraft to computer system 102 periodically, continually, randomly, or at other intervals. For example, the second client may provide an API to computer system 102 to provide the status information for the spacecraft. If computer system 102 determines that the spacecraft's status is poor, then a quality score for the second client may decrease based on the satellite constellation access target for the second client. If the second client's quality score decreases below a quality metric threshold for the second client, then the second client may receive a tier boost to improve the second client's quality score. As a result of the updated quality score for the second client, one or more new satellite constellation access programs may be generated for the second client that includes increased contacts with the satellite constellation to facilitate communications with the spacecraft.

In some embodiments, scheduling subsystem 110 may be configured to store information related to state values across different scheduling executions. For instance, information related to client accounts, spacecraft, or other information, that may be used as input by scheduling subsystem 110 when generating subsequent satellite constellation access programs may be stored. Some examples of state values that may be stored in memory and used as input when generating satellite constellation access programs include, but are not limited to (which is not to imply that other lists are limiting), rejections from the last N days (e.g., 1 or more days, 7 or more days, 14 or more days, 30 or more days, etc.), rejections across all passes, credits for tier boosting, an average amount of time that a client accessed a satellite constellation, an average amount of time that each client accessed the satellite constellation, or a number of satellite constellation access requirements that were filtered out based on satellite constellation visibilities, or other values.

In some embodiments, computer system 102 may implement a framework for generating and selecting satellite constellation access programs for clients based on client data. The framework may be compatible with various machine learning processes, including reinforcement learning, deep learning, Gaussian process modeling, or other methodologies. In some embodiments, the framework may be implemented using a RESTful API. Visibility data for each satellite of each satellite constellation, and information regarding availabilities and services of each satellite ground station may be stored in advance. The satellite constellation access programs may be generated and selected in real-time or in batch modes. As client's needs change, updates to client data may be provided to computer system 102, and updated satellite constellation access programs may be generated and selected for those clients. It can be common that a client's needs remain static most of the time, which can minimizes the amount of real-time processing needed.

In some embodiments, a system state indicates a collection of satellite ground stations and client requests. Visibility data for each satellite ground station is capable of being determined in advance, and the client requests indicate what parameters computer system 102 uses to generate candidate satellite constellation access programs and select a satellite constellation access program from the candidates for each client in order to obtain an optimal scheduling solution for each client. In some embodiments, the system state may be represented as a tuple:
State=<Satellite constellation access targets, Schedule, Visibility Data>

The Schedule indicates an existing list of tasks to be performed. For example, each existing task may be represented by the satellite identifier, a ground station identifier, a start time of the task, and an end time of the task.

In some embodiments, scoring subsystem 108, scheduling subsystem 110, and selection subsystem 112 may collectively or individually be configured to perform one or more algorithms to generate and select satellite constellation access programs for clients that maximize the satellite constellation access targets of each client. As mentioned previously, the algorithms may operate in real-time so as to adjust and update based on client data modifications. For example, Algorithm 1 refers to a procedure for selecting a satellite constellation access program (e.g., Schedule(clients, visibilities), and Algorithm 2 refers to a procedure for selecting determining a Total QoS for a given satellite constellation access program. Pseudocode describing Algorithms 1 and 2 are included below.

| Algorithm 1. | |
|---|---|
| 1: | procedure Schedule(clients, visibilities) |
| 2: | output ←∅ |
| 3: | while something ≠ 0 do |
| 4: | for client ∈ clients do |
| 5: | v = filter(visibilities, client) |
| 6: | choice = SelectOptimal(user, v, output) |
| 7: | output = output ∪ choice |
| 8: | end for |
| 9: | end while |
| 10: | end procedure |

| Algorithm 2 | |
|---|---|
| 1: | procedure SelectOptimal(client, visibilities) |
| 2: | best_score ←−∞ |
| 3: | for vis ∈ visibilities do |
| 4: | prefs = filter(client.preferences, vis) |
| 5: | score = score(vis, prefs) |
| 6: | if score > best_score then |
| 7: | score = best_score |
| 8: | best = vis |
| 9: | end if |
| 10: | end for |
| | return best |
| 11: | end procedure |

Algorithm 1 takes metadata about clients and visibilities as input. The metadata for each client includes that client's satellite constellation access requirements and satellite constellation access targets. In some embodiments, the client's metadata is specific to that client. The satellite visibilities provided represent an opportunity for a satellite owned or operated by the client to communicate with a communication device (e.g., a satellite modem) located at a specific satellite ground station. The metadata for each satellite visibility may include a start time and an end time, which reflects the time that remains available after accounting for existing resource allocations and other system availability restrictions. Algorithm 1 may return an "output," which include candidate satellite constellation access programs. Each candidate satellite constellation access program may include a client that is associated with the request, visibilities allocated to that client, a start time and an end time for the visibilities which are selected in order to maximize quality score for the client given the client's specified satellite constellation access targets. Algorithm 1 may iterate over each client and leverages the "SelectOptimal" function, (as indicated by Algorithm 2), to make a selection of the satellite constellation access program for each client.

In some embodiments, Algorithm 2 may iterate over a provided list of available and compatible visibilities for a given client. A total quality score may be computed for each available visibility, and a maximum total quality score may be used to identify the satellite constellation access program from the candidate satellite constellation access programs that is best for each client.

Additional details related to Algorithms 1 and 2 are also described below.

Figure 4:
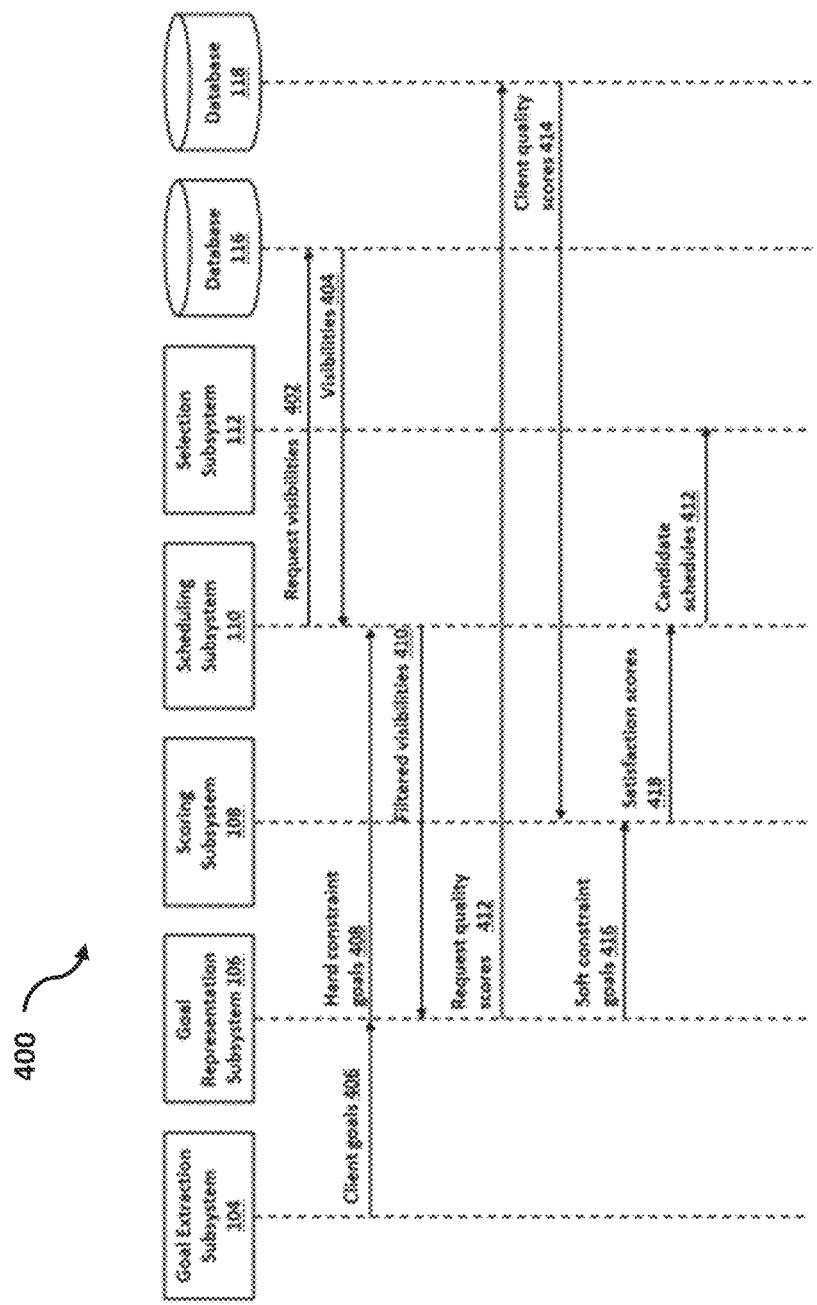
FIG. 4 is an illustrative diagram of a process flow for generating candidate satellite constellation access programs, in accordance with various embodiments.

FIG. 4 is an illustrative diagram of a process flow for generating candidate satellite constellation access programs, in accordance with various embodiments. In particular, FIG. 4 depicts a process 400 for obtaining candidate satellite constellation access programs for one or more clients of computer system 102. In some embodiments, scheduling subsystem 110 may request, at 402, visibilities from satellite location database 116. Satellite location database 116 may store a continually updated list of locations of satellites of one or more satellite constellations, orbital trajectories of those satellites, elevations of the satellites, and other information related to the orbital paths of satellites. For example, satellite location database 116 may store a list of which satellites will be visible by which satellite ground stations. The satellite location information may be updated dynamically, periodically, manually, or a combination thereof. At 404, scheduling subsystem 110 may retrieve the visibilities for all satellites in a satellite constellation or in multiple satellite constellations. Additional details related to satellite location information is described in U.S. patent application Ser. No. 16/290,734, entitled "System and Method for Authorizing Access in Satellite Communications," and filed on Mar. 1, 2019, the disclosure of which is incorporated herein by reference in its entirety.

In some embodiments, goal extraction subsystem 104 may obtain client data from client device 140 operated by a client via network 130 and may extract satellite constellation access requests from the client data. Goal extraction subsystem 104 may provide, at 406, the satellite constellation access requests to representation subsystem 106. In some embodiments, goal extraction subsystem 104 may parse the client data to identify satellite constellation access requirements and satellite constellation access targets for the client. Representation subsystem 106 may, at 408, provide representations of the satellite constellation access requirements of the client to scheduling subsystem 110. The satellite constellation access requirements, and the representations of those satellite constellation access requirements, may be used by scheduling subsystem 110 to filter the visibilities obtained from satellite location database 116. The filtering process may remove visibilities that do not conform to the needs of the client. For example, if a client only seeks access to a satellite constellation during business hours (e.g., 9:00 AM to 5:00 PM), the satellite constellation access requirements may serve to remove any satellite visibilities that occur outside of the business hours. The filtered visibilities may be provided, at 410, to representation subsystem 106.

In some embodiments, representation subsystem 106 may request quality scores related to one or more clients of system 100 from client score database 118 at 412. The requested quality scores may relate to quality scores computed for each client based on previous satellite constellation access programs generated for each client. The quality scores may indicate how well the previously generated satellite constellation access programs complied with each of the satellite constellation access requirements and satellite constellation access targets. At 414, scoring subsystem 108 may retrieve the client quality scores from client score database 118. In some embodiments, at 416, satellite constellation access targets specified by the client data may be provided from representation subsystem 106 to scoring subsystem 108. The satellite constellation access targets, or representations of those satellite constellation access targets, may indicate preferences of the clients for contacting the satellite constellation. Furthermore, the satellite constellation access targets may include weights assigned to each satellite constellation access target indicating a level of importance each satellite constellation access target has to that particular client's mission. In some embodiments, the satellite constellation access targets may be modified to encompass, include, or represent, state values associated with scheduling subsystem 110 from prior scheduling executions. Some examples of state values that may be stored in memory and used as input when generating satellite constellation access programs include, but are not limited to (which is not to imply that other lists are limiting), a number of rejections from the last N days (e.g., 1 or more days, 7 or more days, 14 or more days, 30 or more days, etc.), a total number of rejections across all passes, credits for tier boosting, an average amount of time that a client accessed a satellite constellation, an average amount of time that each client accessed the satellite constellation, a number of satellite constellation access requirements that were filtered out based on satellite constellation visibilities, or other information.

The satellite constellation access targets, including the state values, may be used by scoring subsystem 108 to compute a quality score for each client's satellite constellation access targets and, at 418, the quality scores for each satellite constellation access target may be provided to scheduling subsystem 110. Based on the quality scores, the visibilities may be further refined by scheduling subsystem 110 to produce a plurality of candidate satellite constellation access programs for each client customized to address each client's satellite constellation access targets and the state values. The candidate satellite constellation access programs may be provided, at 412, to selection subsystem 112 for selecting a satellite constellation access program for each client. Selection subsystem 112 may be configured to evaluate candidate satellite constellation access programs in light of the satellite constellation access targets, their corresponding weights, and the state values. Each satellite constellation access program may be examined to determine whether it can be modified to cause a client's quality score to be improved. In some embodiments, selection subsystem 112 may use numeric techniques to continually analyze, modify, and re-analyze the candidate satellite constellation access programs until stopping criteria are met. For example, selection subsystem 112 may continue until a predetermined amount of time has elapsed (e.g., 0.5 seconds or less, 1 second or less, 5 seconds or less, 1 minute or less, etc.). As another example, selection subsystem 112 may continue until a predetermined number of satellite constellation access programs have been analyzed, modified, and re-analyzed. After the stopping criteria has been met, the best satellite constellation access program for the clients (e.g., the satellite constellation access programs that produce clients having improved quality scores) may be selected and used to generate connectivity data for facilitating the clients connecting to the satellite constellation.

In some embodiments, scheduling subsystem 110 may implement one or more different types of algorithmic solutions for generating and selecting satellite constellation access programs. The various algorithmic solutions, which may also be referred to herein interchangeably as "solvers," may be swapped out with one another depending on the particular configurations of system 100. For instance, some solvers may have increased accuracy but decreased speed, while other solvers may be fast but not as accurate. Example solvers that may be used include the Genetic Algorithm, a brute force approach, a custom solver, or other solvers. In some embodiments, algorithms that or the same or similar to Algorithms 1 and/or Algorithms 2, as described above, may be used as solvers for generating and selecting satellite constellation access programs.

First Scheduling Example

As a first example for scheduling a client based on the client's goals, the client may provide client data indicating satellite constellation access requests. In some embodiments, a client may provide the client data to computer system 102 via network 130. In the first scheduling example, for illustrative purposes, the satellite constellation includes a single satellite. The satellite constellation access requests may include two satellite constellation access targets: (1) 3 hours of contact time per day with a satellite constellation; and (2) that each of the contacts be spaced out by approximately 3 hours. Goal extraction subsystem 104 may receive the client data and may extract the satellite constellation access requests from the client data. The client data may be provided as a data structure formatted based on the client inputting their satellite constellation access requests via UI 210. Alternatively, the client data may be provided as a message or in response to receipt of the message. The message may include plain text, voice, images, video, or a combination thereof. Goal extraction subsystem 104 may employ natural language processing, speech recognition processing, image processing, or other machine learning techniques to extract the satellite constellation access requests from the message.

In some embodiments, a determination may be made as to whether the satellite constellation access requests include any satellite constellation access requirements. If so, then representation subsystem 106 may identify a representation for each satellite constellation access requirement and provide the representations to scheduling subsystem 110 to determine a set of visibilities that satisfy the requirements. In some embodiments, if no visibilities are identified that satisfy the given satellite constellation access requirements, computer system 102 may provide a notification to the client indicating that no visibilities are available for the given requests, and new requests may be submitted.

After determining the set of visibilities that satisfy the satellite constellation access requirements, representation subsystem 106 may select a representation to characterize each of the satellite constellation access targets, if any, that are included in the requests. In the first scheduling example, the satellite constellation access request includes two satellite constellation access targets. The first satellite constellation access target, 3 hours of contact time per day with a satellite constellation, may be represented using a logistic function. In some embodiments, representation subsystem 106 may select the logistic function from a set of available utility functions, and may determine whether the selected utility function accurately represents the satellite constellation access target. For example, with reference to FIG. 5A, graph 500 depicts representation 502 describing the first client goal of a preferred amount of time contacting the satellite constellation per day. As seen with reference to FIG. 5A and Equation 1, representation 502 includes an offset parameter δ=3, corresponding to the preferred amount of time that the client seeks access (e.g., 3 hours). Furthermore, representation 502 may have a large value for the parameter k (e.g., k=100), indicating that the client strongly prefers to have contact times of 3 hours, and receives little value for times less than 3 hours, and no additional value for contacts greater than 3 hours. Representation 502 may appear to have a "step function"-like shape due to the large value for k.

Figure 5A:
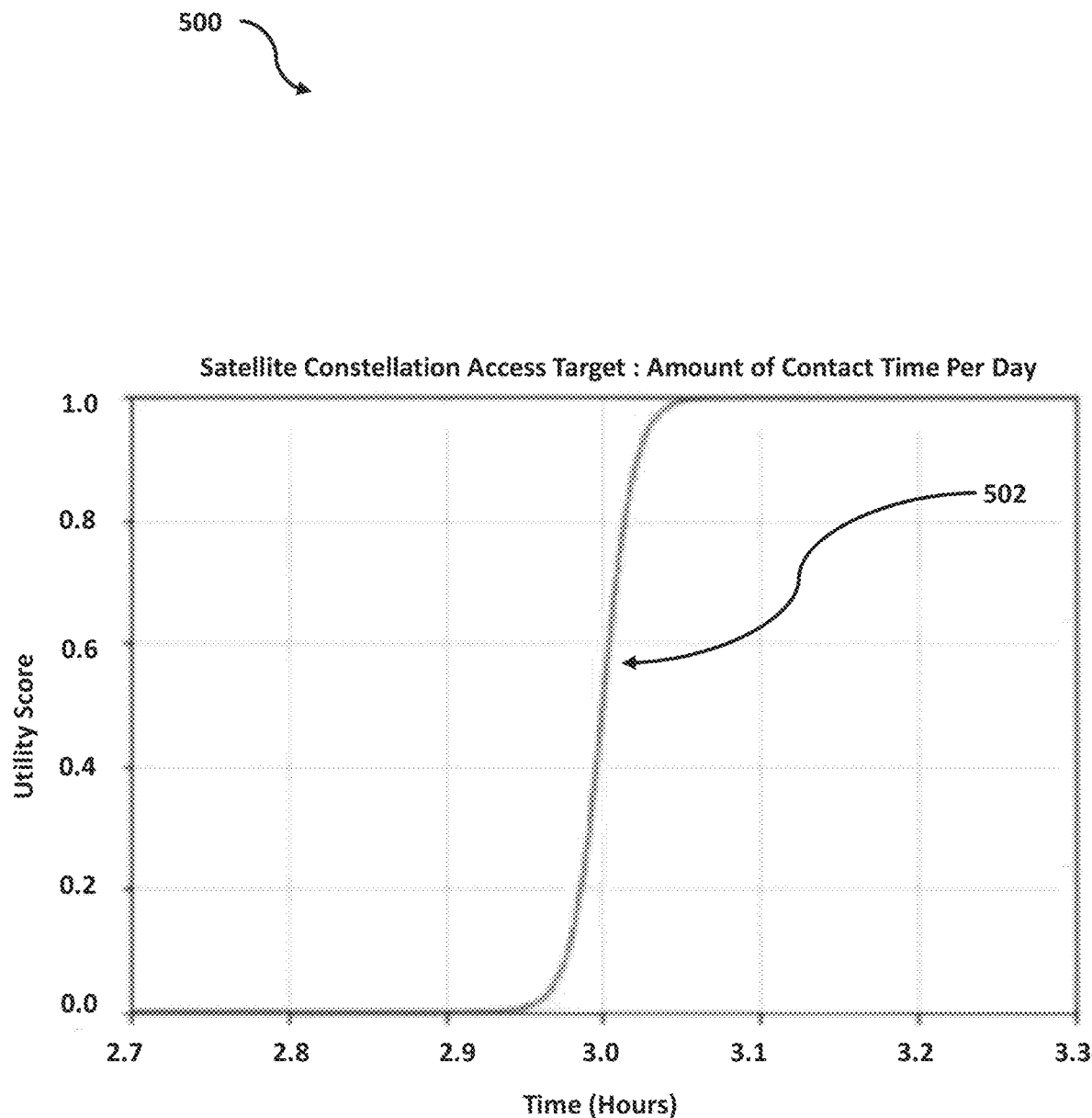
FIGS. 5A and 5B are illustrative diagrams of example utility functions used to describe satellite constellation access requests, in accordance with various embodiments.
Figure 5B:
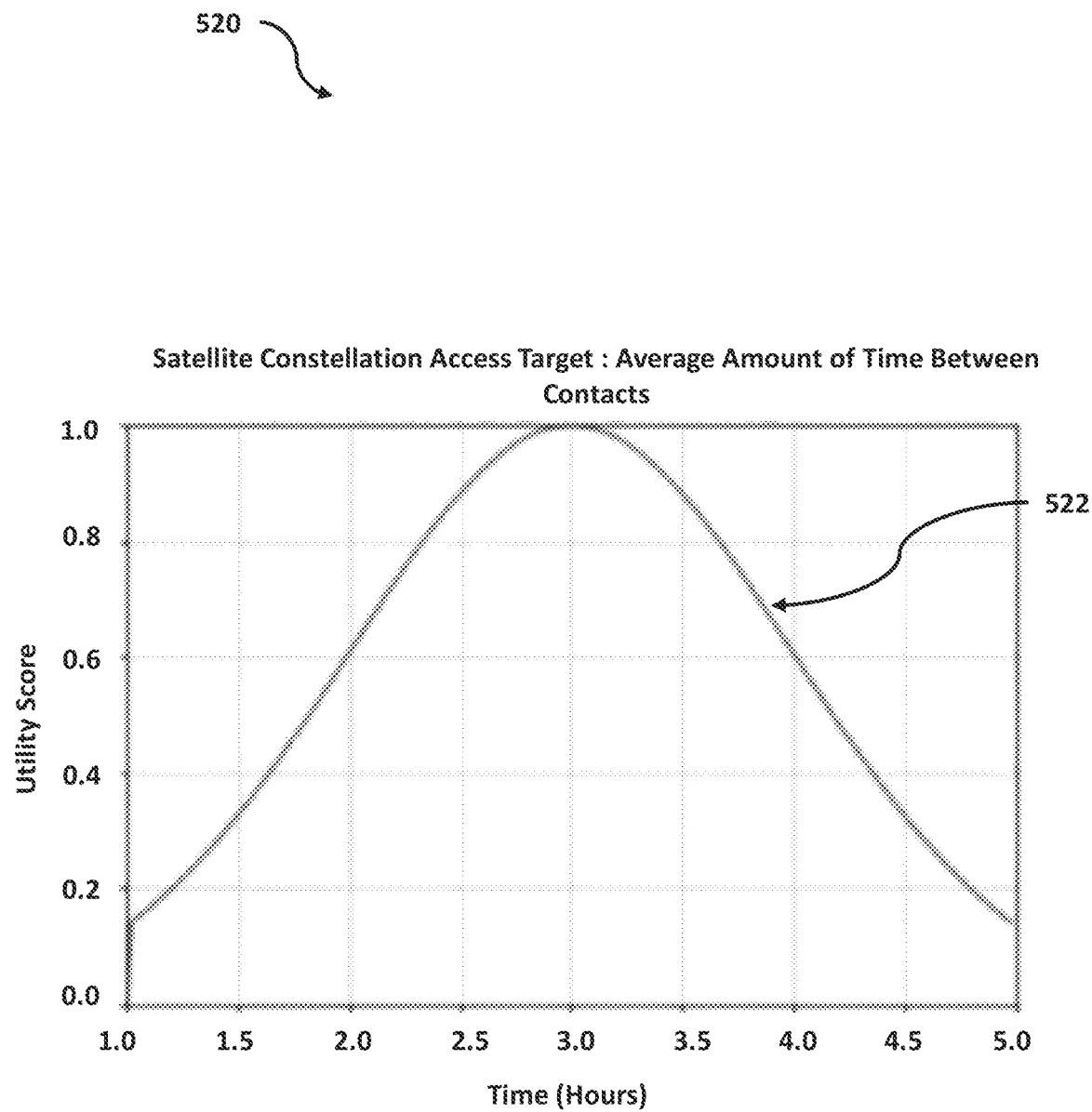

In some embodiments, the second satellite constellation access target included each contact be spaced out by approximately 3 hours. Representation subsystem 106 may select a Gaussian function as the utility function for representing this satellite constellation access target. For example, with reference to FIG. 5B, graph 520 depicts a representation 522 describing the second satellite constellation access target of a preferred amount of time between contacts with the satellite constellation. As seen from FIG. 5B, representation 522 includes an offset parameter δ=3, corresponding to the preferred amount of time between contacts (e.g., 3 hours), and a standard deviation parameter σ=1. Furthermore, representation 522 indicates that the satellite constellation access target has an optimal utility score for contacts spaced apart by 3 hours, however there is flexibility. For instance, the utility score is 0.6 if the contacts are spaced apart by 2 hours or 4 hours. In some embodiments, the client data may include weights assigned to each of the satellite constellation access target indicating a level of importance for a particular satellite constellation access target. The weights may sum to 1.0 on a unit vector (e.g., the sums of the squares of the weights equals 1.0).

Figure 5C:
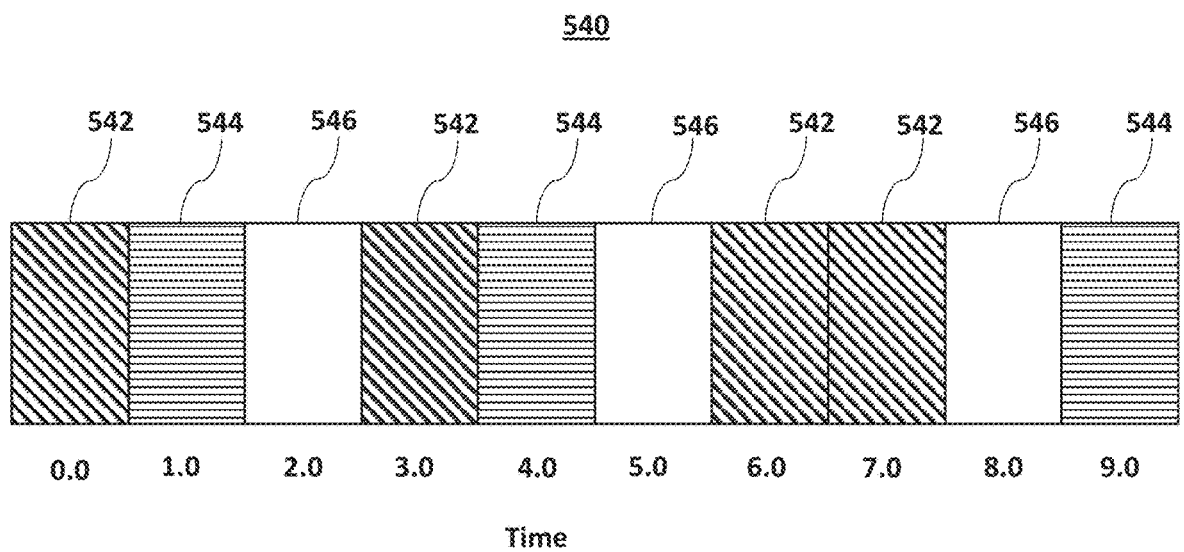
FIGS. 5C and 5D are illustrative diagrams of example satellite constellation access programs generated for a first use case, in accordance with various embodiments.

Some embodiments include scheduling subsystem 110 generating a satellite constellation access program for the client where the second satellite constellation access target of the client is produced a high utility score. As an example, with reference to FIG. 5C, candidate satellite constellation access program 540 includes portions 542, 544, and 546, representing different temporal intervals. Portions 542 may correspond to temporal intervals where the satellite constellation is not visible based on the satellite constellation access requirements of the client. Portions 544 may correspond to temporal intervals where the satellite constellation is visible for the client based on the satellite constellation access requirements, but the client is not allocated access to the satellite constellation during those temporal intervals. Portions 546 may correspond to temporal intervals where the satellite constellation is visible for the client based on the satellite constellation access requirements, and the client is allocated access to the satellite constellation during those temporal intervals.

Each of portions 542, 544, and 546 may represent a same amount of time. For example, candidate satellite constellation access program 540 may include ten equal temporal intervals (e.g., intervals 0-9), each of which represents 2.4 hours. As detailed above with respect to the clients goals, candidate satellite constellation access program 540 allocates three contacts to the client per day, as seen by the three portions 546. As each of portions 546 corresponds to 2.4 hours, this indicates that candidate satellite constellation access program 540 provides the client with 7.2 hours of contact with the satellite constellation per day. As seen in FIG. 5A, total contact time in excess of 3.0 hours per day generates a utility score of 1.0, indicating that candidate satellite constellation access program has a utility score of 1.0. Furthermore, the average amount of time between contacts for candidate satellite constellation access program 540 is approximately 2.3 hours. Therefore, the satellite constellation access target of three hours between contacts is partially satisfied. As seen in FIG. 5B, an average time between contacts of 2.3 hours has a utility score of approximately 0.7. Thus, the total utility score may be a weighted combination of the utility score for the first satellite constellation access target (e.g., 1.0) and the second satellite constellation access target (e.g., 0.0.7). For example, if both targets have an equal weight (e.g., 0.5), then is Total QoS=0.85.

Figure 5D:
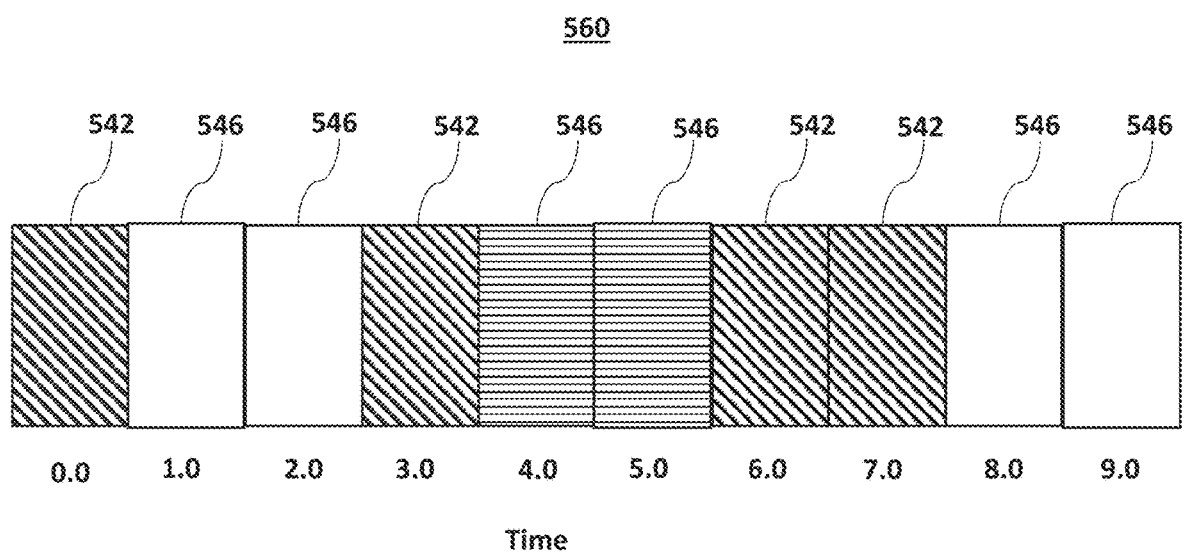

In some embodiments, upon receiving candidate satellite constellation access program 540, the client may determine to modify an amount of weight assigned to the first and/or second satellite constellation access target. For example, the client may decide to reduce an amount of weight (e.g., how important) of the average amount of time between contacts and increase the weight for the total contact time per day. In response to modifying the weights for each client target, scheduling subsystem 110 may generate additional candidate satellite constellation access programs, and selection subsystem 112 may select one of those candidate satellite constellation access programs. As an example, with reference to FIG. 5D, candidate satellite constellation access program 560 includes portions 542, 544, and 546. Based on the satellite constellation access targets and the modified weights assigned thereto, candidate satellite constellation access program 560 may be generated by scheduling subsystem 110. Candidate satellite constellation access program 560 may include two instances of portions 542 where the client is allocated access to the satellite constellation. These two instances of portions 542 encompass approximately 4 hours of time, which is less than the 7.2 hours allocated by candidate satellite constellation access program 540. As seen in FIG. 5A, the utility score for 4 hours of contact is 1.0. However, for candidate satellite constellation access program 560, the average amount of time between contacts is 7.2 hours (e.g., 0.5×(2.4 hours+12 hours)). Referring to FIG. 5B, average amounts of time between contacts greater than 5 hours yields a utility score less than 0.2, which is less than the quality score for the second satellite constellation access target obtained for candidate satellite constellation access program 540. Even if the second satellite constellation access target is weighted much higher than the first satellite constellation access target (e.g., $w_1=0.1$; $w_2=0.9$), the Total QoS=0.28. Therefore, for the first scheduling example, selection subsystem 112 may select candidate satellite constellation access program 540 for the client based on the given satellite constellation access requirements and targets, the weights assigned to each, and any other clients attempting to access the same satellite constellation.

In some embodiments, scheduling subsystem 110 and the client individually or collectively modify the weights assigned to each client satellite constellation access target to obtain a customized satellite constellation access program for the client. Therefore, multiple different weights may be tried, and satellite constellation access programs produced, before a final satellite constellation access program is selected by selection subsystem 112. Furthermore, other clients' satellite constellation access targets and the modifications made to the weights assigned to those satellite constellation access targets may also impact the candidate satellite constellation access program that are generated by scheduling subsystem 110. Therefore, while some modifications may satisfy some satellite constellation access targets more than others (e.g., produce a greater utility score), those modifications may negatively impact a large number of other clients, and therefore computer system 102 may reject those modification.

Second Scheduling Example

As a second example for scheduling a client based on the client's goals, the client may provide client data including satellite constellation access requests that indicate two satellite constellation access targets: (1) that contacts with a satellite constellation be spaced out by approximately 3 hours, and (2) an amount of contact per day with the satellite constellation being greater than 6 hours and less than 8 hours. In particular, the second constellation access target indicates that contact times between 6 and 8 hours satisfy the client's goals (e.g., yield a same utility score), however contact times in excess of 8 hours is too much (e.g., there is an exponential decrease in utility score for contact times over 8 hours). One difference between the first scheduling example's satellite constellation access requests and the second scheduling example's satellite constellation access requests is that, in the latter, a pseudo-hard constraint is introduced. For instance, in this example, if the client receives a satellite constellation access program having less than 6 hours of contact per day, then the satellite constellation access program provides the client no value (e.g., a utility score of 0.0).

Figure 6A:
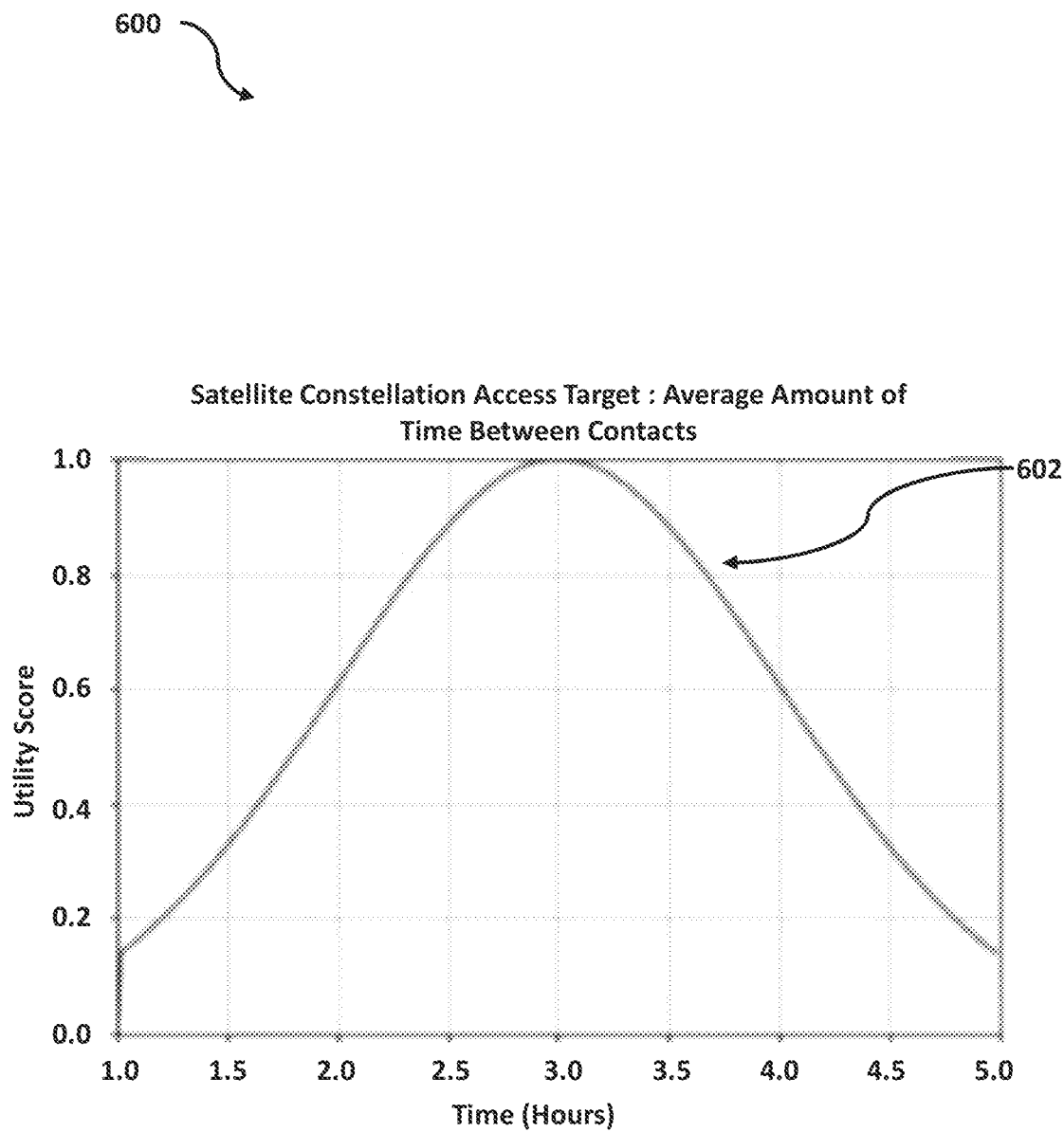
FIGS. 6A and 6B are illustrative diagrams of example utility functions used to describe satellite constellation access requests, in accordance with various embodiments.

In some embodiments, the client's first goal, an average amount of time between contacts of 3 hours, may be represented by a Gaussian function. For example, with reference to FIG. 6A, graph 600 depicts representation 602 describing the first satellite constellation access target (e.g., a preferred amount of time between contacts with the satellite constellation per day of approximately 3 hours). Graph 600 and representation 602 of FIG. 6A may be substantially similar to graph 520 and representation 522 of FIG. 5B, and the previous description may apply.

Figure 6B:
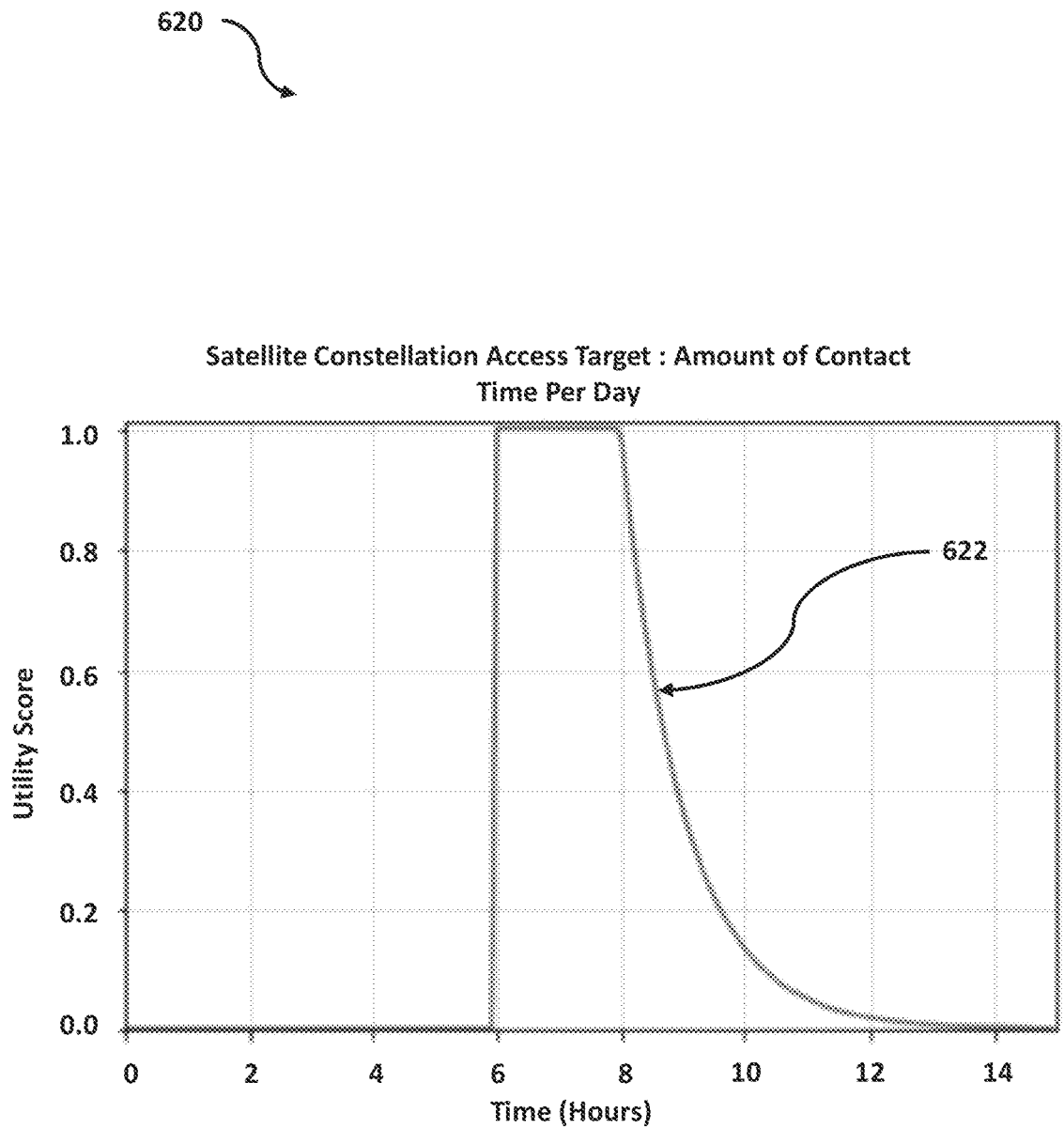

In some embodiments, the client's second satellite constellation access target (e.g., an amount of contact per day with the satellite constellation of at least 6 hours, where contact times between 6-8 hours having a same optimal quality score, while anything greater than 8 hours produces a quality score that decreasing exponentially), may be represented using a half-life function. For example, with reference to FIG. 6B, graph 620 depicts a representation 622 describing the second satellite constellation access target. As seen from FIG. 6B, representation 622 has an offset parameter $\delta=6$, corresponding to the preferred amount of contact time per day with the satellite constellation contacts (e.g., 6 hours). For daily contact time between 6 and 8 hours, the utility score equals 1.0. If the amount of contact with the satellite is less than 6 hours per day, then this produces a utility score of 0.0. Furthermore, as indicated by representation 622, a large decay parameter $\lambda$ yields a quality score that decreases quickly for contacts time greater than 8 hours. For example, contact times per day of 10 hours produces a quality score less than 0.2, and contact times per day of 14 hours or more produce a quality score of approximately 0.0.

The second scheduling example may be considered more limiting than the first scheduling example with respect to the optimal amount of contact times. For instance, the first scheduling example would accept a large number of contact times per day, but no additional value is obtained for extra contacts. For example, 3 hours of contact time per day produces the same utility score that 8 hours of contact time per day (e.g., utility score of 1.0). In the second scheduling example, a penalty is introduced for contact times that exceed 8 hours. For example, in the second scheduling example, more than 8 hours of contact time per day produces utility scores that decrease exponentially. Therefore, scheduling subsystem 110 may be more constricted when generating satellite constellation access programs to account for these constraints, and may implement more volatility when selecting an average amount of time between contacts to try and balance the selection parameters.

Third Scheduling Example

Figure 7A:
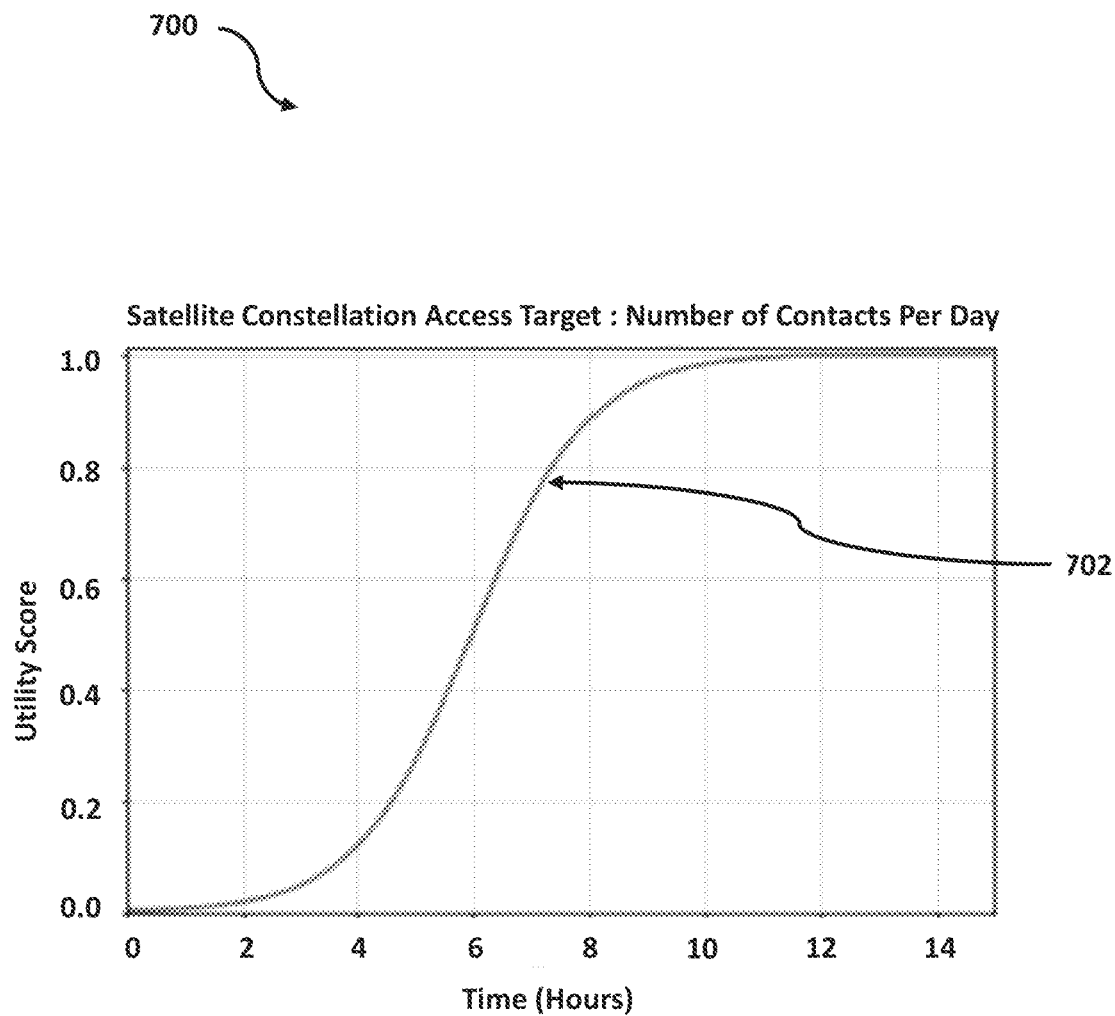
FIGS. 7A and 7B are illustrative diagrams of example utility functions used to describe satellite constellation access requests, in accordance with various embodiments.

As a third example for scheduling a client based on the client's goals, the client may provide client data including satellite constellation access requests that indicate two satellite constellation access targets: (1) a preference for a number of contacts per day with a satellite constellation of 10 contacts, with no additional value being derived for more than 10 contacts per day and diminishing value being derived for less than 10 contacts per day; and (2) an amount of time between consecutive contacts with the satellite constellation of 2-4 hours per day with diminishing value for more than 4 hours of time between consecutive contacts. In some embodiments, the client's first satellite constellation access target (e.g., 10 contacts per day, with no additional value for more than 10 contacts per day and diminishing value for less than 10 contacts per day), may be represented by a logistic function. For example, with reference to FIG. 7A, graph 700 depicts representation 702 describing the first satellite constellation access target for the preferred number of contacts with the satellite constellation per day. As seen from graph 700, representation 702 may have offset 6=10, corresponding to the preferred amount of contacts per day that the client seeks access. Furthermore, representation 702 may have a medium value for k (e.g., k=40), indicating that the user prefers to have 10 contacts per day, would be satisfied with fewer contacts per day, and obtains no additional value if provided more than 10 contacts per day.

Figure 7B:
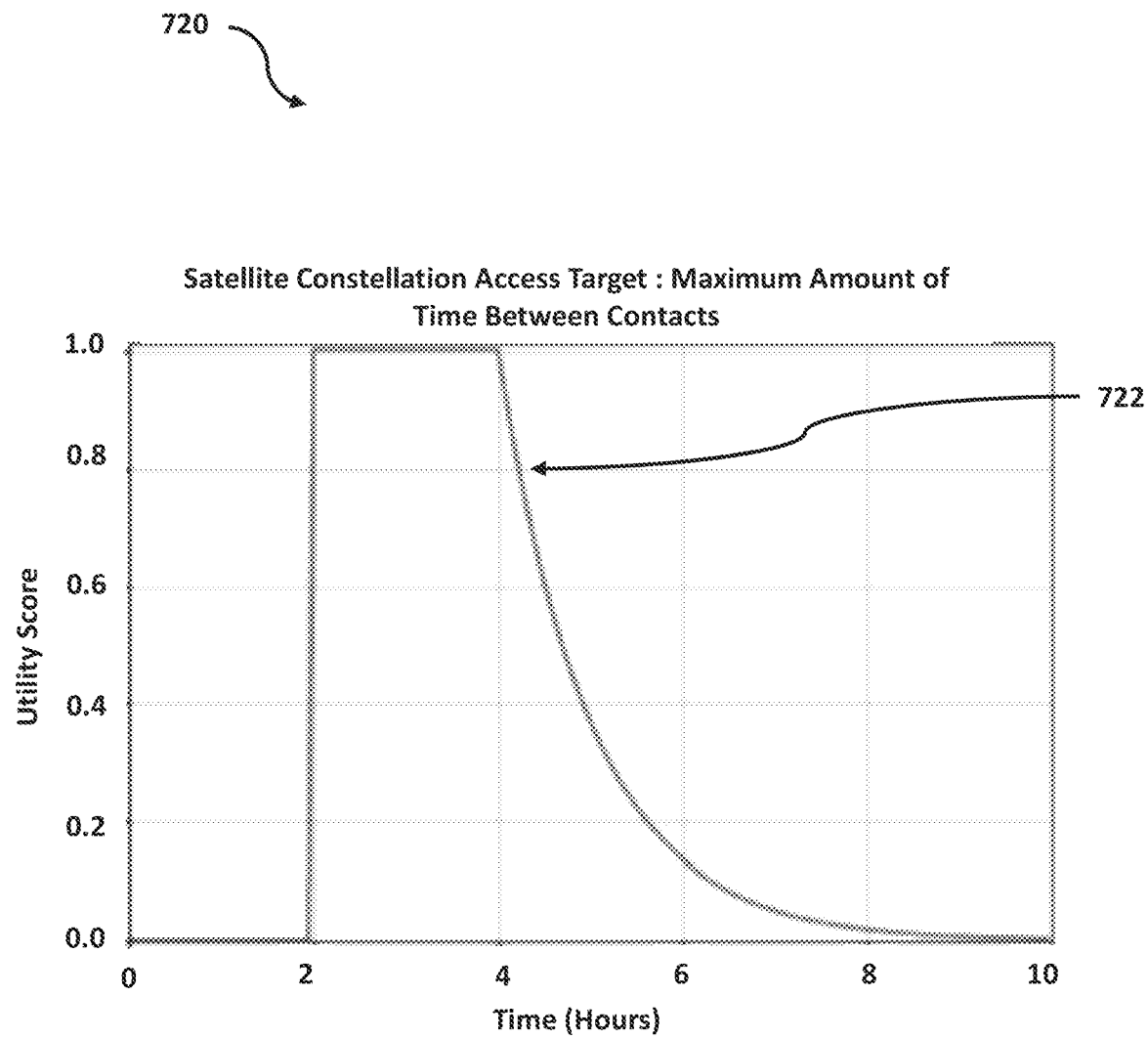

In some embodiments, the client's second satellite constellation access target (e.g., an amount of time between consecutive contacts of 2-4 hours per day with diminishing value for the amount of time between consecutive contacts being greater than 4 hours), may be represented using a half-life function. For example, with reference to FIG. 7B, graph 720 depicts a representation 722 describing the second client goal of a preferred amount of time between contacts. As seen from FIG. 7B, representation 722 has an offset parameter δ=2, corresponding to the preferred amount of time between contacts, wherein the offset parameter δ=2-4 produces a same quality score. For example, if the amount of time between consecutive contacts is 2 hours, the utility score is 1.0, and if the amount of time between consecutive contacts is 4 hours, the utility score is also 1.0. As seen by representation 722, if the amount of time between consecutive contacts is less than 2 hours, the utility score is 0.0. Furthermore, representation 722 may have a decay parameter λ indicating that representation 722 yields a quality score that decreases quickly for amounts of time between consecutive contacts being greater than 4 hours. For example, if the amount of time between consecutive contacts is 5 hours, the utility score produced is 0.4, and if the amount of time between consecutive contacts is 8 hours, the utility score is approximately 0.0.

Depending on the amount of visibilities that remain after filtering (e.g., after removing all visibilities that have a maximum amount of time between contacts of less than 2 hours), scheduling subsystem 110 may identify a large number of candidate satellite constellation access programs due to the specificity of the second satellite constellation access target. For example, scheduling subsystem 110 may assign a large number of short tasks to the client to fill in the gaps between clients that request large and infrequent contact times. In some embodiments, to further refine the possible satellite constellation access programs for the client, additional constraints may be added. For instance, the client may include an average time between contacts to cause scheduling subsystem 110 to identify more specific satellite constellation access programs that fit the clients' goals.

Fourth Scheduling Example

In a fourth scheduling example, two clients—client A and client B—each provide client data to computer system 102 indicating each client's goals. As seen with reference to FIGS. 8A and 8B, client A provides satellite constellation access requests including two satellite constellation access targets: (1) a contact time per day of 10 hours per day, with less satisfaction being obtained for total contact time per day of less than 10 hours, no additional value being obtained for total contact times greater than 10 hours, and minimal satisfaction for total contact time of less than 4 hours; (2) an average amount of time for each contact with the satellite constellation of 2 hours. In some embodiments, client A's first satellite constellation access target may be represented by a logistic function. For example, with reference to FIG. 8A, graph 800 depicts representation 802 describing client A's first satellite constellation access target (e.g., a preferred amount of contact time with the satellite constellation per day). As seen from graph 800, representation 802 may have an offset parameter δ=10, corresponding to the preferred amount of contact time per day. In this example, for contact times per day of 10 hours, the utility score is 1.0. Furthermore, representation 802 may have a medium value for decay parameter k (e.g., k=40), indicating that client A prefers to have 10 hours of contact time with the satellite constellation, but less contact is acceptable with decreasing satisfaction, while client A is in indifferent contact times in excess of 10 hours per day. For example, two hours of contact per day with the satellite constellation produces a utility score of >0.1.

In some embodiments, client A's second satellite constellation access target may be represented by a Gaussian function. For example, with reference to FIG. 8B, graph 820 depicts representation 822 describing client A's second satellite constellation access target (e.g., of a preferred average amount of contact with the satellite constellation per day). As seen from graph 820, representation 822 may have an offset parameter δ=2, corresponding to the preferred average amount of contact that sought by client A. For example, if the average amount of contact with the satellite constellation provided by a selected satellite constellation access program is 2 hours, the utility score obtained would be 1.0. Furthermore, representation 822 may have a small value for deviation parameter σ (e.g., σ=2), indicating that client A prefers to have an average amount of contact of 2 hours per day, and slightly more or slightly less than 2 hours of contact with the satellite constellation for each contact is acceptable at decreasing levels of satisfaction. For example, the utility score produced for average contact times of both 1.0 and 3.0 hours is approximately 0.6. As another example, for average contact times lasting more than hours, the utility score produced for client A may be 0.0.

Figure 8A:
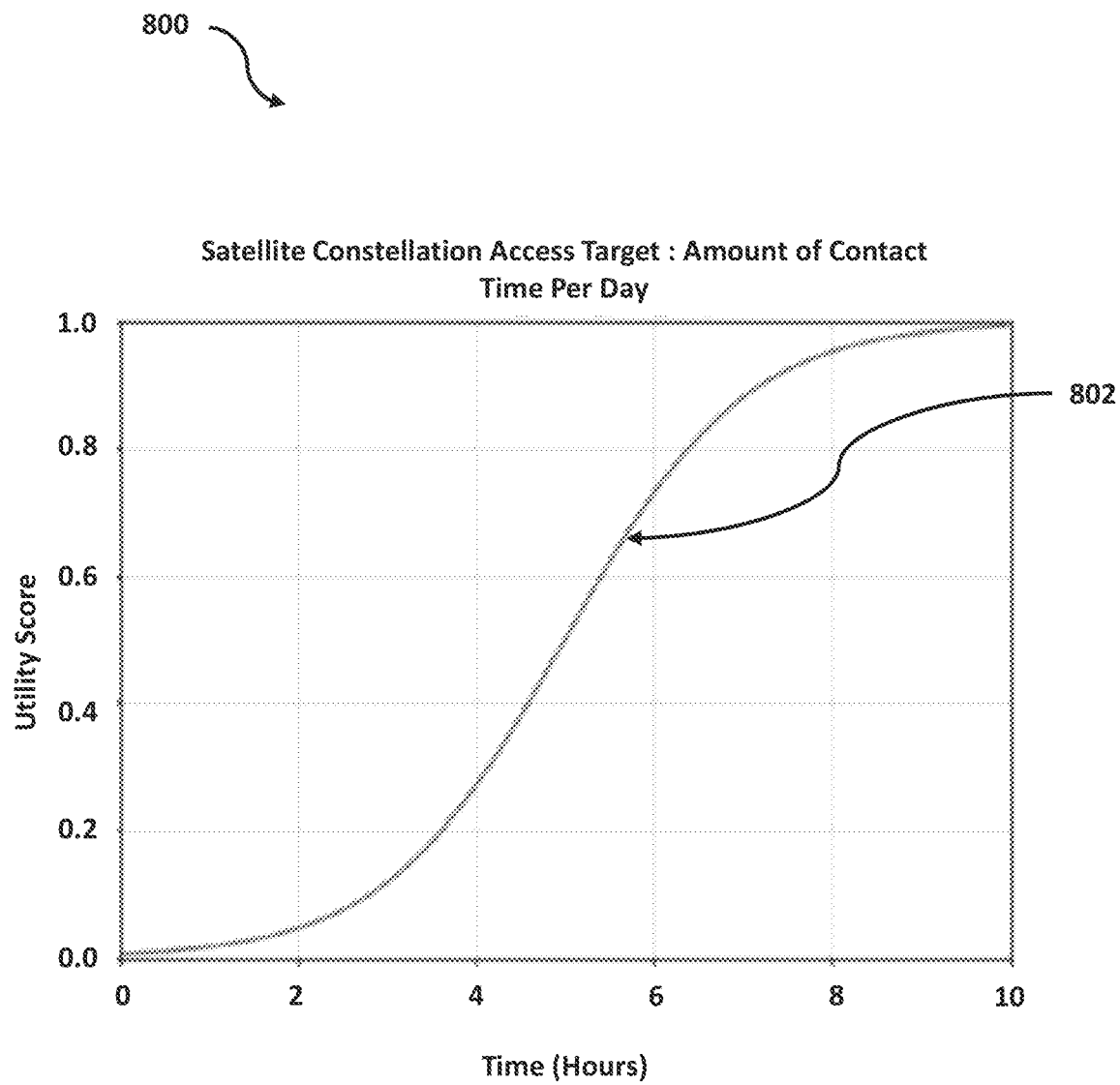
FIGS. 8A-D are illustrative diagrams of example utility functions used to describe satellite constellation access requests, in accordance with various embodiments.
Figure 8B:
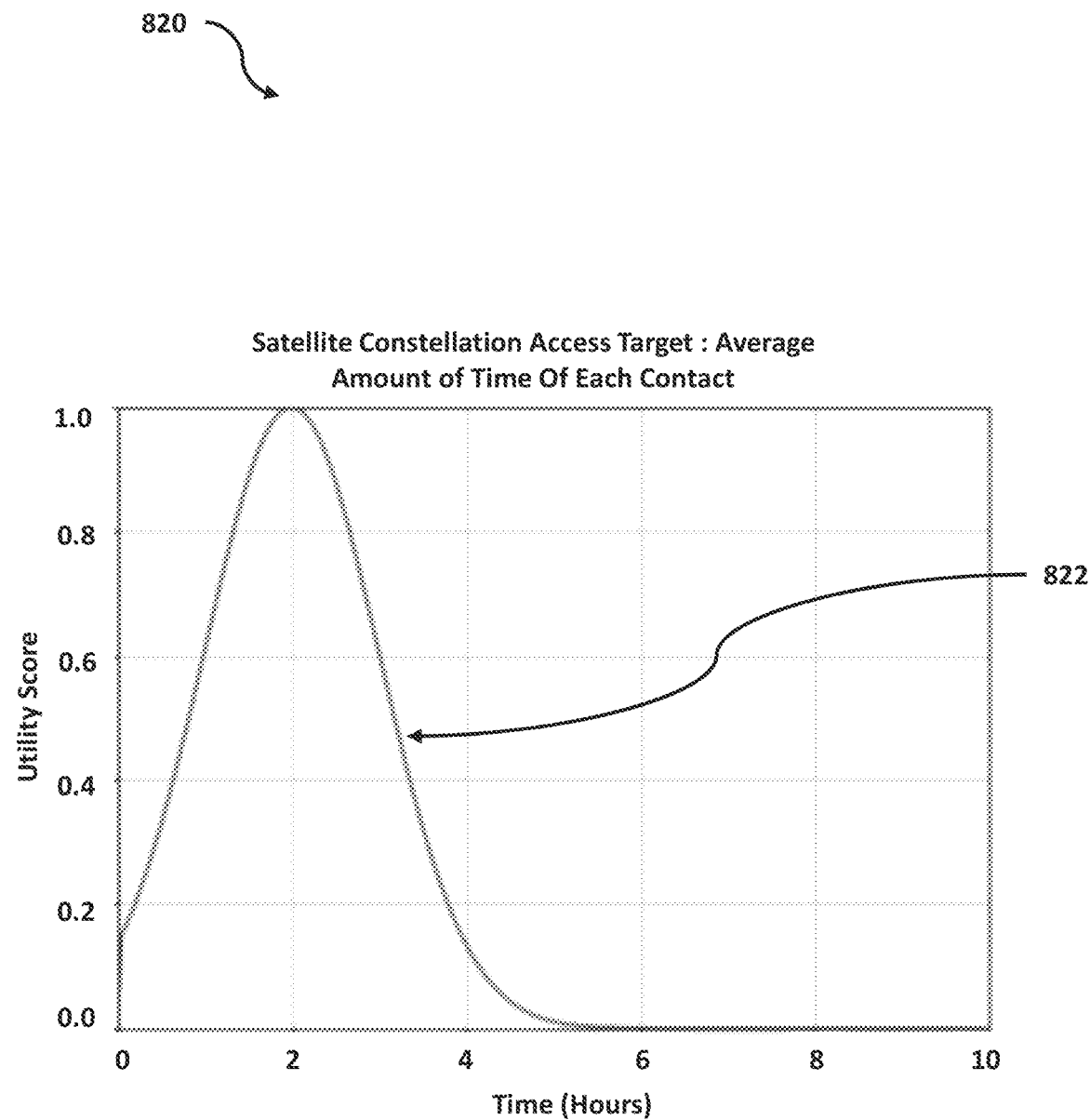
Figure 8C:
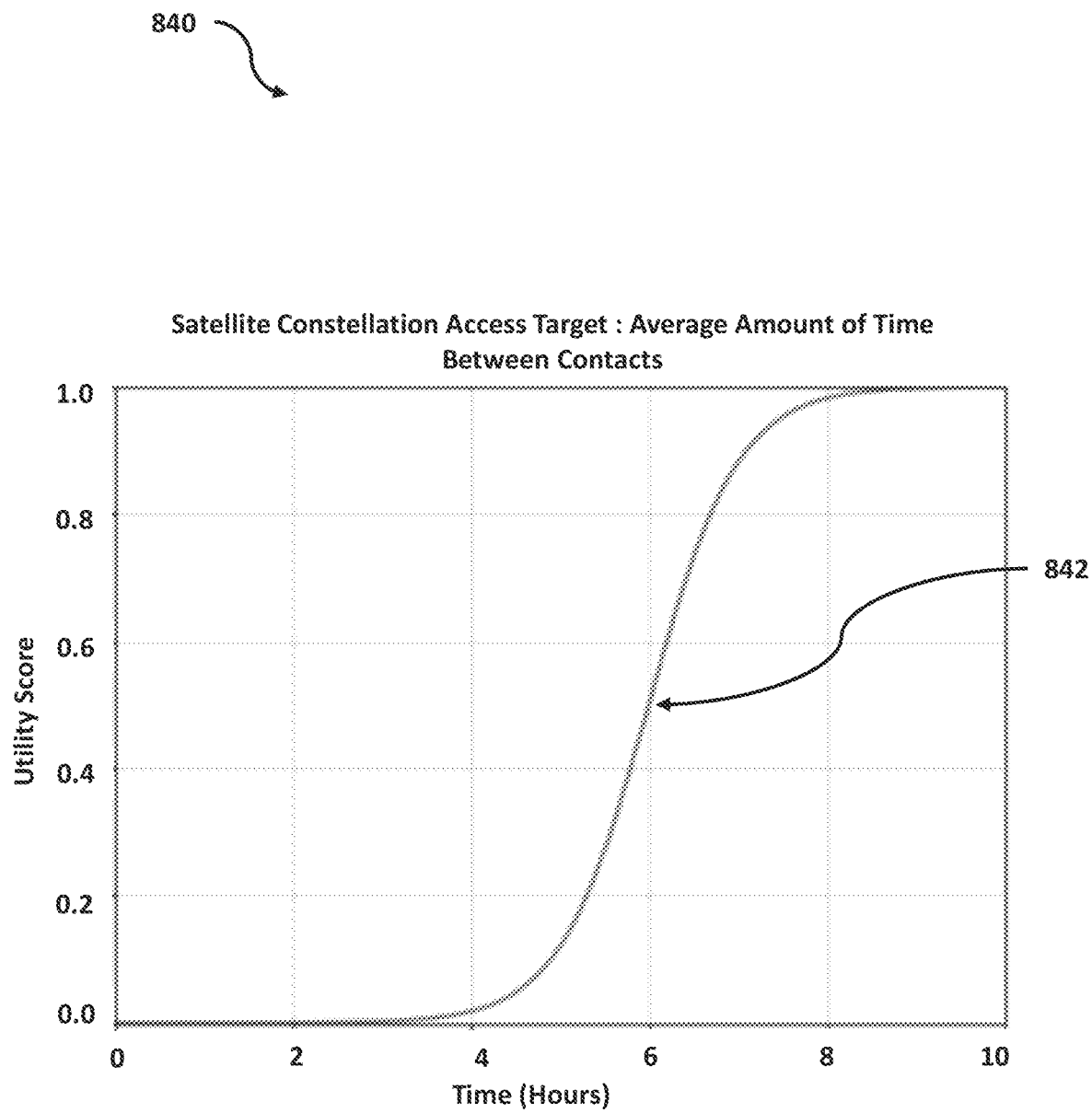
Figure 8D:
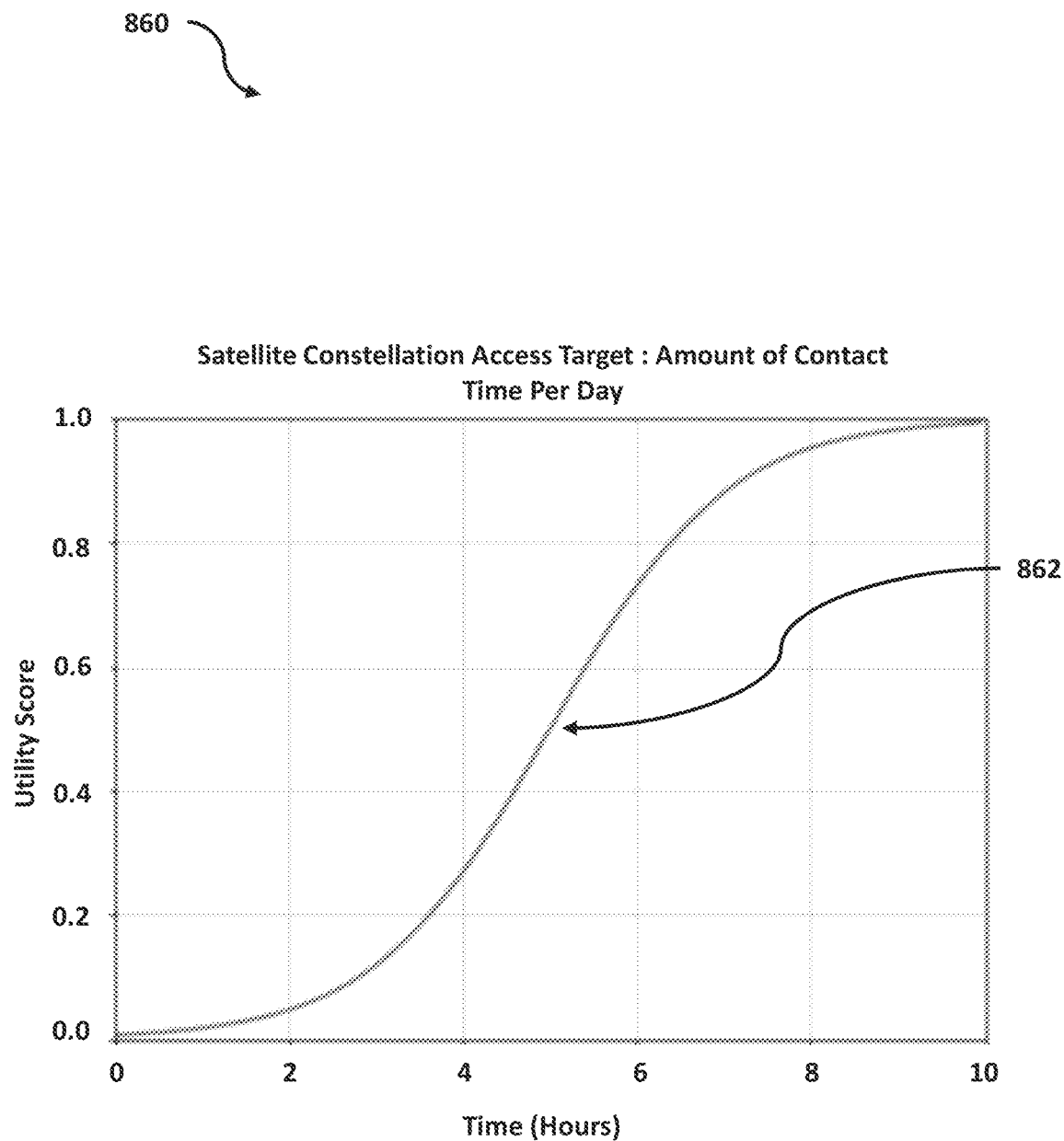

As seen with reference to FIGS. 8C and 8D, client B provides satellite constellation access requests including two satellite constellation access targets: (1) an average time between contacts with the satellite constellation of approximately 8 hours; and (2) a total amount of contact per day of 10 hours, with less value being obtained for contact time totals less than 10 hours, no additional value being obtained for more contact time totals in excess of 10 hours, and minimal value for contact time totals of less than 4 hours. In some embodiments, client B's second satellite constellation access target and client A's first satellite constellation access target may be represented in a similar manner (e.g., a logistic function). For example, with reference to FIG. 8D, graph 860 depicts representation 862 describing client B's second satellite constellation access target of a 10 hours of contact with the satellite constellation per day, whereas FIG. 8A depicts representation 802 describing client A's first satellite constellation access target of 10 hours of contact with the satellite constellation per day. As client A and client B both have a same or similar goal, graphs 800 and 860 are substantially similar, and the previous description may apply.

In some embodiments, client B's first satellite constellation access target may be represented by a logistic function. For example, with reference to FIG. 8C, graph 840 depicts representation 842 describing client B's first satellite constellation access target of a preferred average amount of time between contacts. As seen from graph 840, representation 842 may have an offset parameter δ=8, corresponding to the preferred average amount of time between contacts sought after by client B (e.g., 8 hours). Furthermore, representation 842 may have a medium value for k (e.g., k=60), indicating that client B prefers to have an average amount time between contacts between approximately 6 and 8 hours per day, where the average amount of time between contacts less than 4 hours provides little to no value to client B (e.g., a utility score less than 0.3), and where the average amount of time between contacts being greater than 8 hours provides no additional value to client B (e.g., a utility score of approximately 1.0).

Figure 9A:
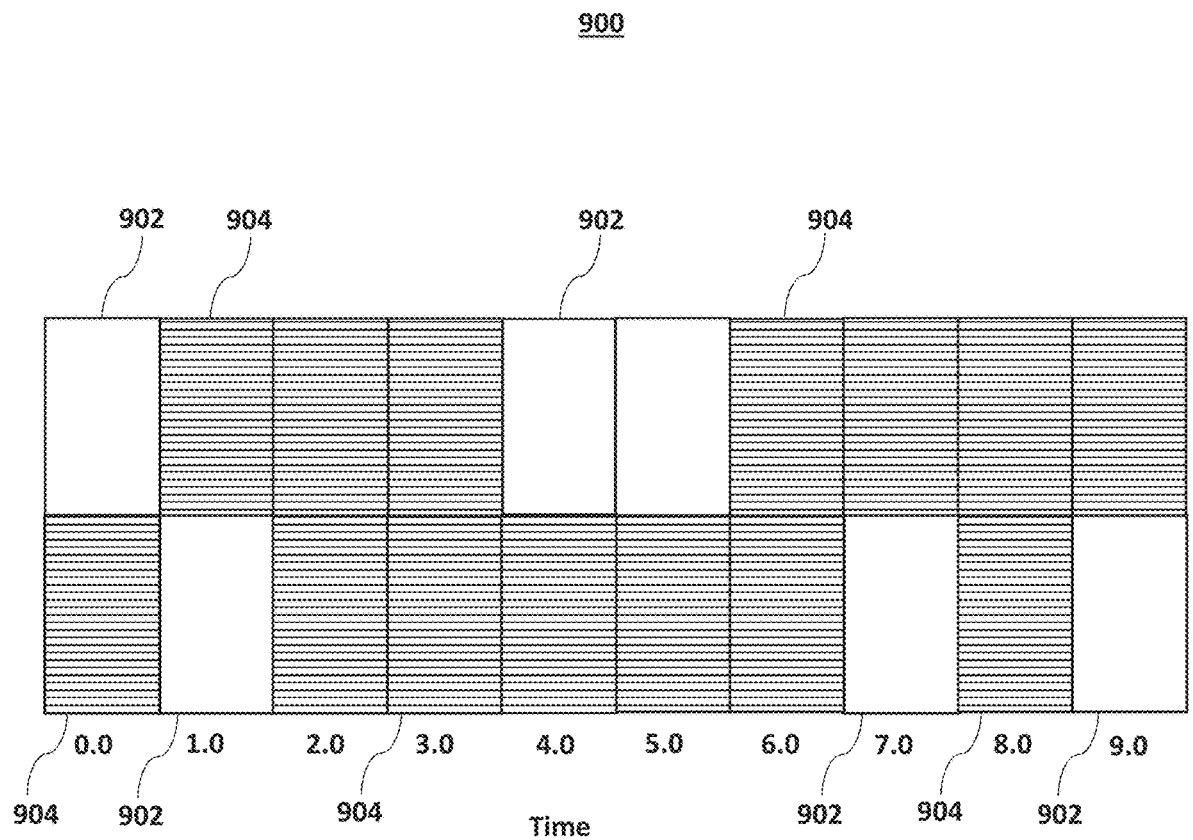
FIGS. 9A and 9B are illustrative diagrams of example satellite constellation access programs for a use case, in accordance with various embodiments.
Figure 9B:
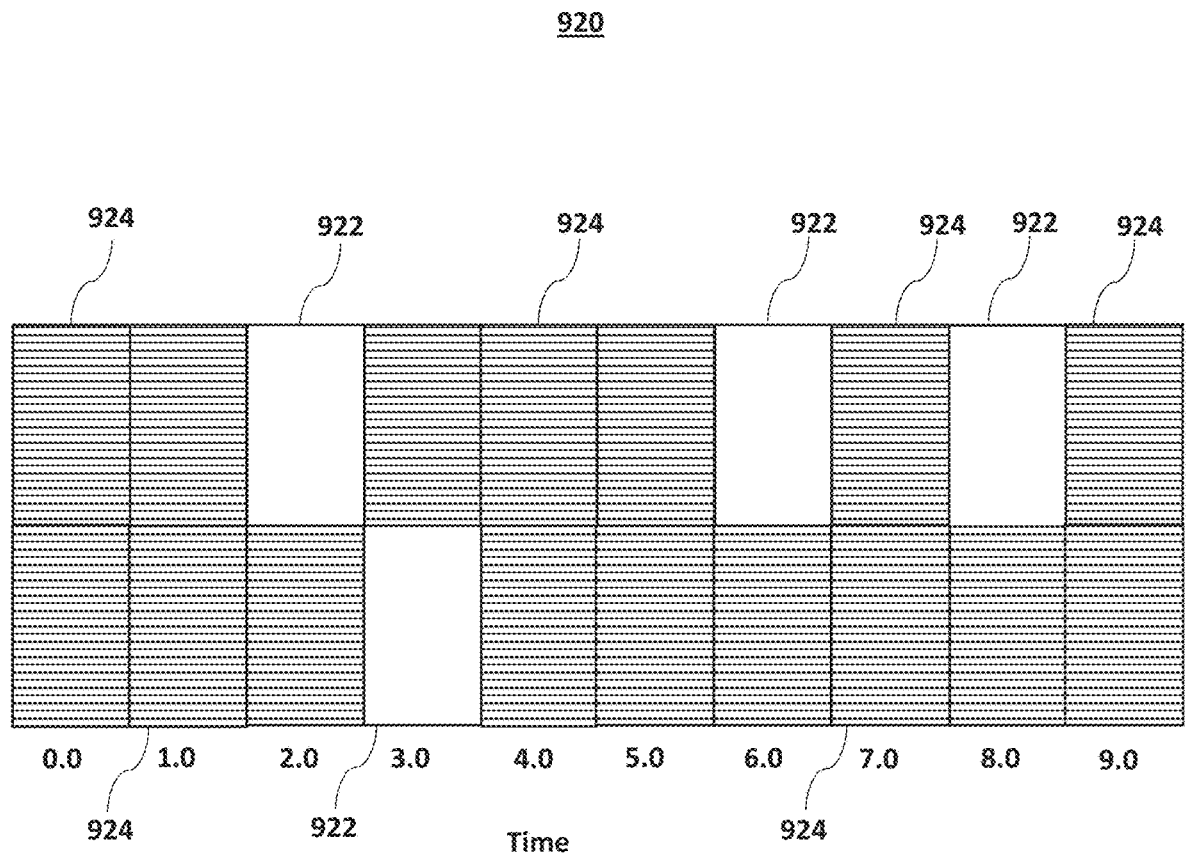

In some use cases, where a satellite constellation includes four satellites and a single satellite ground station can always be seen by the four satellites of the satellite constellation, based on client A and client B's respective satellite constellation access targets and representations thereof, scheduling subsystem 110 may be configured to generate candidate satellite constellation access programs for clients A and B. In some embodiments, selection subsystem 112 may select one satellite constellation access program from the candidate satellite constellation access programs for client A and another satellite constellation access program from the candidate satellite constellation access programs for client B. As an example, with reference to FIGS. 9A and 9B, a satellite constellation access program 900 is selected from a plurality of candidate satellite constellation access programs for client A and another satellite constellation access program 920 is selected from the plurality of candidate satellite constellation access programs for client B.

Satellite constellation access program 900 may include portions 902 indicating temporal intervals during which client A is allocated access to the satellite constellation, whereas portions 904 indicate temporal intervals during which client A is not allocated access to the satellite constellation. In particular, satellite constellation access program 900 indicates when client A may connect to a satellite ground station and access two of the four satellites of the satellite constellation. As seen in satellite constellation access program 900, a top row of portions 902 and 904 indicate availabilities for connection to the satellite ground station to access a first satellite of the satellite constellation, whereas the bottom row of portions 902 and 904 indicate available for connection to the satellite ground station to access a second satellite of the satellite constellation. Satellite constellation access program 920 may include portions 922 indicating temporal intervals during which client B is allocated access to the satellite constellation, whereas portions 924 indicate temporal intervals during which client B is not allocated access to the satellite constellation. In particular, satellite constellation access program 920 indicates when client B may connect to the satellite ground station and access two of the four satellites of the satellite constellation. As seen in satellite constellation access program 920, a top row of portions 922 and 924 indicate availabilities for connection to the satellite ground station to access a third satellite of the satellite constellation, whereas the bottom row of portions 922 and 924 indicate available for connection to the satellite ground station to access a fourth satellite of the satellite constellation.

As seen with respect to satellite constellation access programs 900 and 920, despite both client A and client B having a same preference with respect to an amount of time to contact the satellite constellation (e.g., a total amount of contact per day of 10 hours, with less value being obtained for contact time totals less than 10 hours, no additional value being obtained for more contact time totals in excess of 10 hours, and minimal value for contact time totals of less than 4 hours), client A is allocated 14.4 hours (e.g., 6 temporal intervals, each of which having a value of approximately 2.4 hours), whereas client B is allocated 9.6 hours (e.g., 4 temporal intervals, each of which having a value of approximately 2.4 hours). In some embodiments, client A may be allocated more units than client B based on client A's second satellite constellation access target goal—an average amount of time for each contact with the satellite constellation of 2 hours. For instance, because contacts having a temporal duration of 2.4 hours yield a utility score of 0.6 for client A, client A only receives one access window of 4.8 hours, as the six temporal intervals allocated to client A to access the satellite constellation correspond to an average amount of time for each contact being 2.4 hours. Thus, client A's second satellite constellation access target has a utility score of 0.6 for satellite constellation access program 900. Furthermore, client B preferred a large average amount of time between contacts (e.g., an average time between contacts with the satellite constellation of approximately 8 hours). Thus, client B's second satellite constellation access target has a utility score approximately 0.8. Scheduling subsystem 110 may attempt to resolve this by finding a satellite constellation access program for client B that includes a modest total contact time while introducing gaps between each access. Thus, despite both client A and client B having the same preferences for one satellite constellation access target, each of client A and client B's other satellite constellation access targets cause scheduling subsystem 110 to select satellite constellation access programs that best match the satellite constellation access targets of both clients.

Example Flowcharts

Figure 10A:
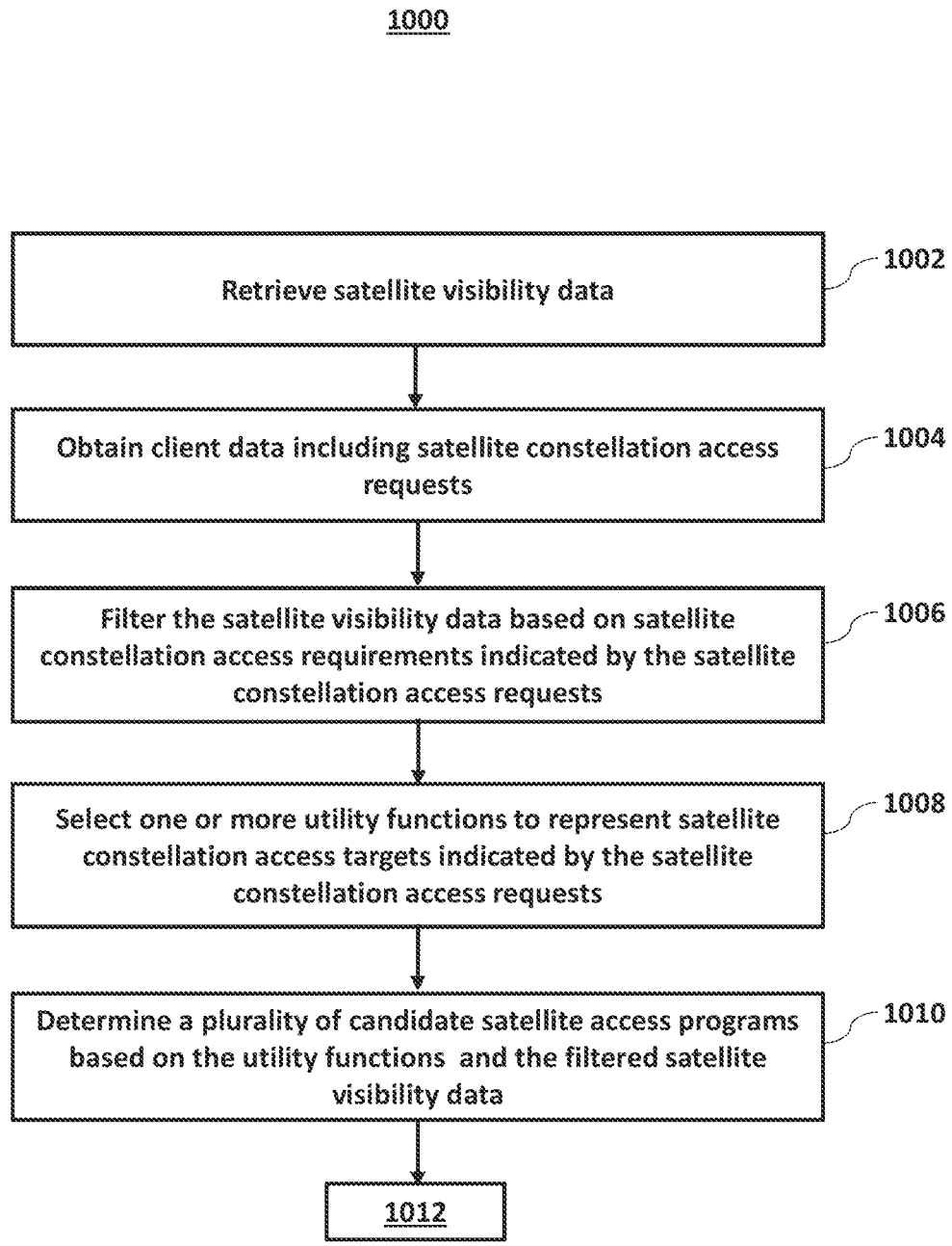
FIGS. 10A-10C are illustrative flowcharts of a process for generating satellite constellation access programs for communicating with a satellite constellation, in accordance with various embodiments.
Figure 10B:
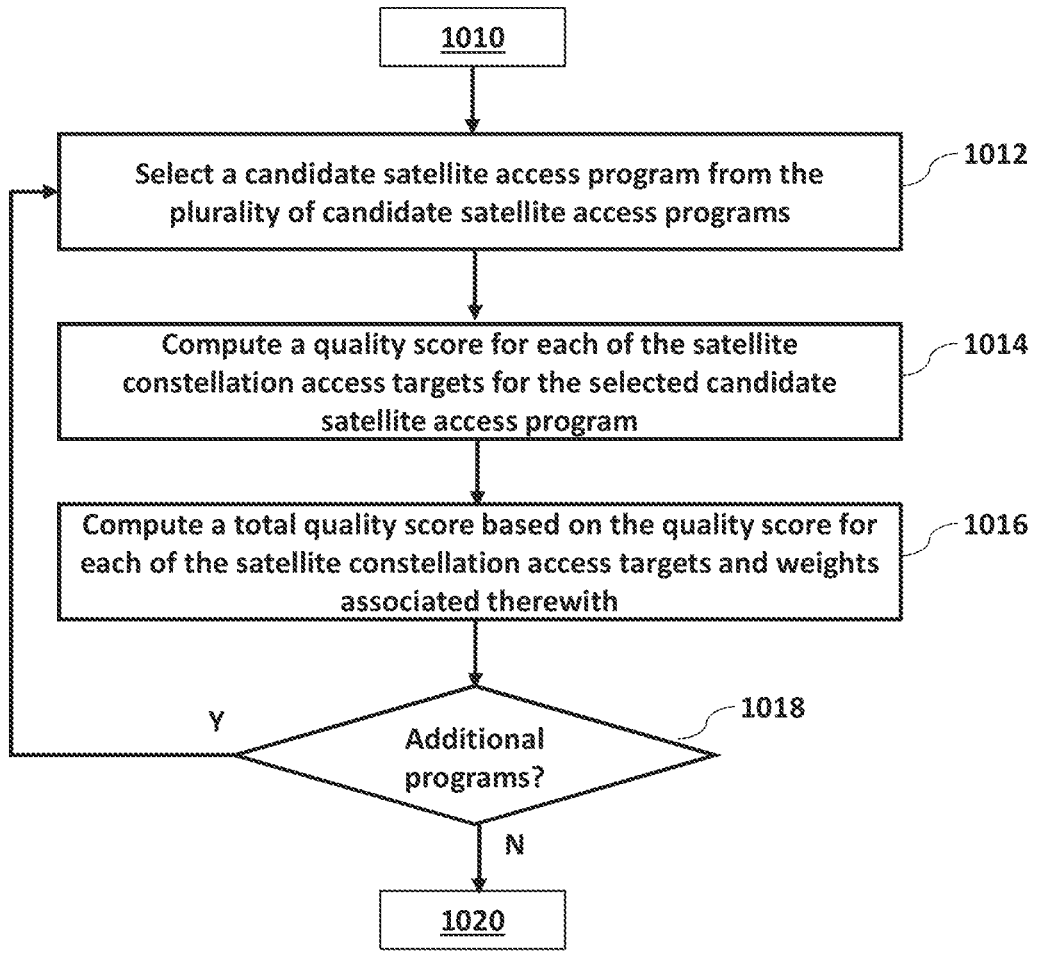
Figure 10C:
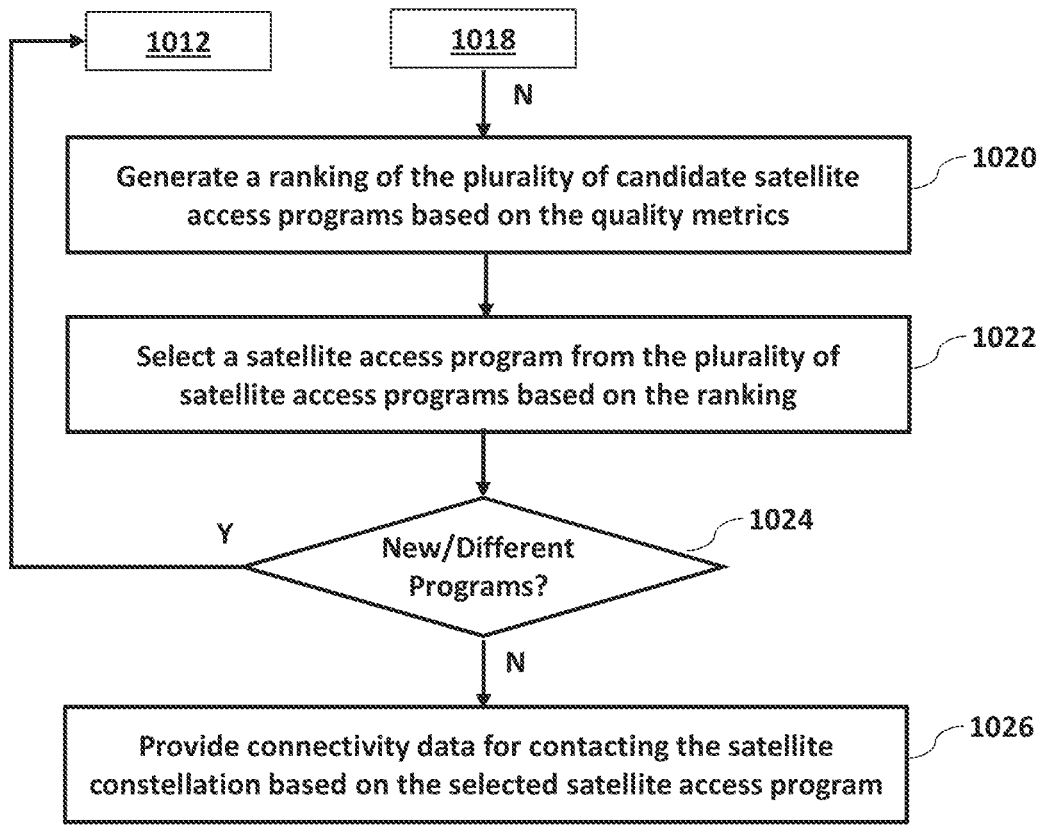

FIGS. 10A-C are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIGS. 10A-C are illustrative flowcharts of a process 1000 for determining a satellite constellation access program for a client, in accordance with various embodiments. In some embodiments, process 1000 may begin at step 1002. At step 1002, satellite visibility data may be retrieved. Satellite visibility data may include information indicating when satellites of a satellite constellation will be visible by one or more satellite ground stations. A satellite that is "visible" by a satellite ground station refers to a satellite that is within a line of sight of at least one satellite dish (e.g., an antenna and receiver) at the satellite ground station with no objects (e.g., other spacecraft, geographical objects, etc.) impeding data signals from being transmitted to the satellite from the antenna and/or vice versa. In some embodiments, the satellite visibility data may be precomputed based on an orbital trajectory of a given satellite or satellites and a location (e.g., a longitude, latitude, elevation, etc.) of a satellite ground station. For example, based on the orbital trajectory of a satellite, the satellite visibility information may indicate that the satellite will pass within communication range of a satellite ground station between a first time and a second time on a given date such that data signals may be communicated to/from the satellite and the satellite ground station. In some embodiments, the satellite visibility data may be stored in satellite location database 116. The satellite visibility data may be updated periodically (e.g., daily, weekly, monthly, etc.), dynamically (e.g., in response to an event), and/or manually. In some embodiments, step 1002 may be performed by a subsystem that is the same or similar to scheduling subsystem 110.

At step 1004, client data including satellite constellation access requests of a client may be obtained. In some embodiments, the satellite constellation access requests may be provided to computer system 102 by client device 140. For example, the client may input the satellite constellation access requests via UI 210, via a message including plain text describing the satellite constellation access requests, via an audio message, and the like. The satellite constellation access requests may indicate requirements and targets of the client with respect to contacting satellites of the satellite constellation. In some embodiments, the satellite constellation access requests may include one or more satellite constellation access requirements and one or more satellite constellation access targets. Each satellite constellation access requirement indicates constraints of the client related to when the client can access to the satellite constellation, for how long the client can access the satellite constellation, how frequently the client can access the satellite constellation, or other requirements of the client. A satellite constellation access requirement that is not fulfilled may provide the client with an unusable or non-valuable access to the satellite constellation. For example, if the client only seeks to access the satellite constellation during the hours between 9:00 AM EST and 5:00 PM EST, providing the client access to the satellite constellation outside of those times would be meaningless. Each satellite constellation access target indicates preferences of the client related to accessing the satellite constellation. For example, the satellite constellation access targets may indicate a preferred number of contacts with the satellite constellation per day and a value that would be obtained by the client for contacts differing from the preferred number of contacts. In some embodiments, each of the satellite constellation access targets may include an associated weight that indicates a level of importance that particular target has for the client. For example, the client may prefer to have 3 contacts per day, each being approximately 2 hours in duration, but would rather have all 3 contacts and is less concerned about whether the duration of those contacts is 2 hours. Therefore, the client may assign a weight to each satellite constellation access target to reflect the importance of that target with respect to the client's overall mission. The weights may be initialized by the client, computer system 102, or both, and may be modified over time. In some embodiments, step 1004 may be performed by a subsystem that is the same or similar to goal extraction subsystem 104.

At step 1006, the satellite visibility data may be filtered based on the satellite constellation access requirements indicated by the satellite constellation access requests. For example, based on the satellite constellation access requirements, certain visibilities that do not coincide with the needs of the client may be removed. Using the aforementioned example, a client that only seeks to access the satellite constellation during the hours between 9:00 AM EST to 5:00 PM EST may have visibilities removed that occur outside of those hours. In some embodiments, the satellite constellation access requirements may remove a large number of available temporal intervals for satellite constellation access. However, the remaining visibilities, represented by the filtered satellite visibility data, conform to the needs of the client and can provide value to the client's mission. In some embodiments, step 1006 may be performed by a subsystem that is the same or similar to scheduling subsystem 110.

At step 1008, one or more utility functions may be selected to represent the satellite constellation access targets of the client as specified by the satellite constellation access requests. In some embodiments, the utility functions may include parameters that are capable of being tuned to conform to the preferences of the client. The utility functions may include logistic functions, Gaussian functions, truncated Gaussian functions, half-life functions, or other functions. Each of the utility functions may include two (or more) parameters that are modified based on the satellite constellation access targets of the client. For example, as seen with respect to FIG. 8B, representation 822 may refer to a utility function describing an average amount of time between satellite constellation contact sought by the client. This example utility function may be characterized using a Gaussian function centered at 2 hours and having a standard deviation of approximately 1 hour. In some embodiments, a client may select the utility functions to represent the satellite constellation access targets. Alternatively or additionally, computer system 102 may select, or provide recommendations of, the utility functions to be used. For example, computer system 102 may provide an initial suggestion of a utility function to represent a particular target, and the client may accept the suggestion or may discard the suggestion and select a different utility function. Furthermore, depending on the utility function that is selected, the weight associated with the satellite constellation access target may be adjusted. In some embodiments, step 1008 may be performed by a subsystem that is the same or similar to representation subsystem 106.

At step 1010, a plurality of candidate satellite constellation access programs may be determined based on the utility functions that were selected and the filtered satellite visibility data. In some embodiments, the plurality of candidate satellite constellation access programs may be determined further based on the weights associated with each of the satellite constellation access targets. Each candidate satellite constellation access program may include temporal intervals (e.g., periods of time beginning at time t1 and ending at time t2) that may be allocated to the client to access a satellite ground station to contact satellites of a satellite constellation. The temporal intervals may be of a duration, frequency, separation, or other aspects to characterize the client's satellite constellation access targets. In some embodiments, temporal intervals, spacings, frequencies, etc., of contacts may be selected for each candidate satellite constellation access program to attempt to accommodate the satellite constellation access targets of the client given the weights assigned to each of the targets. In some embodiments, step 1010 may be performed by a subsystem that is the same or similar to scheduling subsystem 110.

After step 1010, process 1000 may proceed to step 1012, which is detailed in FIG. 10B. At step 1012, a candidate satellite constellation access program from the plurality of candidate satellite constellation access programs may be selected. Upon selection of the candidate satellite constellation access program, process 1000 may proceed to step 1014. In some embodiments, step 1012 may be performed by a subsystem that is the same or similar to scheduling subsystem 110.

At step 1014, a quality score may be computed for each of the satellite constellation access targets for the selected candidate satellite constellation access program. The quality score may indicate a level of compliance the selected candidate satellite constellation access program provides for a given satellite constellation access target. The level of compliance refers to how well the selected satellite constellation access program complies with the given satellite constellation access target. For example, with reference to FIG. 8C, if a given candidate satellite constellation access program provides an average amount of time between contacts of 6 hours, then the quality score for this satellite constellation access target is approximately 0.5. Referring again to FIG. 8C, if a given candidate satellite constellation access program provides an average amount of time between contacts of 8 hours, then the quality score for this target is approximately 1.0. Depending on how many satellite constellation access targets a client provides with their client data, a corresponding number of quality scores may be computed for each candidate satellite constellation access program. In some embodiments, step 1014 may be performed by a subsystem that is the same or similar to scoring subsystem 108.

At step 1016, a total quality score may be computed based on the quality score computed for each of the satellite constellation access targets and the weights associated therewith. In some embodiments, the quality metric may be computed based on a weighted combination of the quality score and weight associated with each of the satellite constellation access targets. For example, the quality metric may be computed based on Equation 5. As a result, the quality metric for the client for a given candidate satellite constellation access program may be obtained. In some embodiments, step 1016 may be performed by a subsystem that is the same or similar to scheduling subsystem 110.

At step 1018, a determination may be made as to whether additional satellite constellation access programs are to be analyzed (e.g., perform steps 1012-1016 again). If so, process 1000 may return to step 1012, where a new satellite constellation access program may be selected and steps 1014 and 1016 are performed for the new satellite constellation access program. This loop may repeat until some or all of the plurality of candidate satellite constellation access programs have been analyzed. In some embodiments, the number of iterations of steps 1012-1016 may be performed until a stopping criteria is met. For example, steps 1012-1016 may repeat until a threshold number of programs have been analyzed, or until a threshold amount of time has elapsed. If, however, at step 1018, it is determined that no additional programs are needed to be analyzed, process 1000 may proceed to step 1020.

At step 1020, a ranking of the plurality of candidate satellite constellation access programs may be generated based on the computed quality metrics. For instance, the plurality of candidate satellite constellation access programs may be ranked from lowest quality metric to highest quality metric. In some embodiments, step 1020 may be performed by a subsystem that is the same or similar to selection subsystem 112.

At step 1022, a satellite constellation access program may be selected from the plurality of satellite constellation access programs based on the ranking. For instance, a satellite constellation access program having a largest quality metric may be selected, indicating that that satellite constellation access program provides the most value to the client to meet the client's requests. In some embodiments, additional requests of additional clients may also be considered when determining which candidate satellite constellation access program to select. For example, if a given candidate satellite constellation access program provides high utility score for the client, but forces multiple other clients to have a low utility score (e.g., not achieving most of their satellite constellation access targets), then computer system 102 may reject the selected candidate satellite constellation access program and select a new/different satellite constellation access program. In some embodiments, step 1022 may be performed by a subsystem that is the same or similar to selection subsystem 112.

At step 1024, a determination may be made as to whether new or different satellite constellation access programs are needed. For example, a determination may be made as to whether the selected satellite constellation access program (e.g., selected at step 1022) causes the utility scores for other clients of system 100 to decrease below a threshold utility score. For example, while a selected satellite constellation access program for a client at step 1022 may produce a quality score of 0.9 for the client, other clients of system 100 may have satellite constellation access programs selected that produce quality scores less than 0.5. If the threshold quality score is 0.5, then this may indicate that new satellite constellation access programs may be needed. If, for example, it is determined that new or different satellite constellation access programs are needed, process 1000 may return to step 1012. However, if it is determined, at step 1024, that new satellite constellation access programs are needed, then process 1000 may proceed to step 1026.

At step 1026, connectivity data may be provided to a client device associated with the client for contacting the satellite constellation based on the selected satellite constellation access program. In some embodiments, the connectivity data may indicate temporal intervals during which the client is authorized to establish a secure connection to a satellite ground station in order to contact a satellite constellation based on the selected satellite constellation access program. In some embodiments, step 1024 may be performed by a subsystem that is the same or similar to connection subsystem 114.

In some embodiments, a boosting factor may be attributed to clients whose quality score is below a particular value after a particular satellite constellation access program has been selected. For example, if the satellite constellation access program selected for a client yields a quality score of 0.6, then this client may receive a boosting factor to increase the likelihood that a subsequent satellite constellation access program selected for the client produces a higher quality score (e.g., greater than 0.8, greater than 0.9, etc.).

Figure 11:
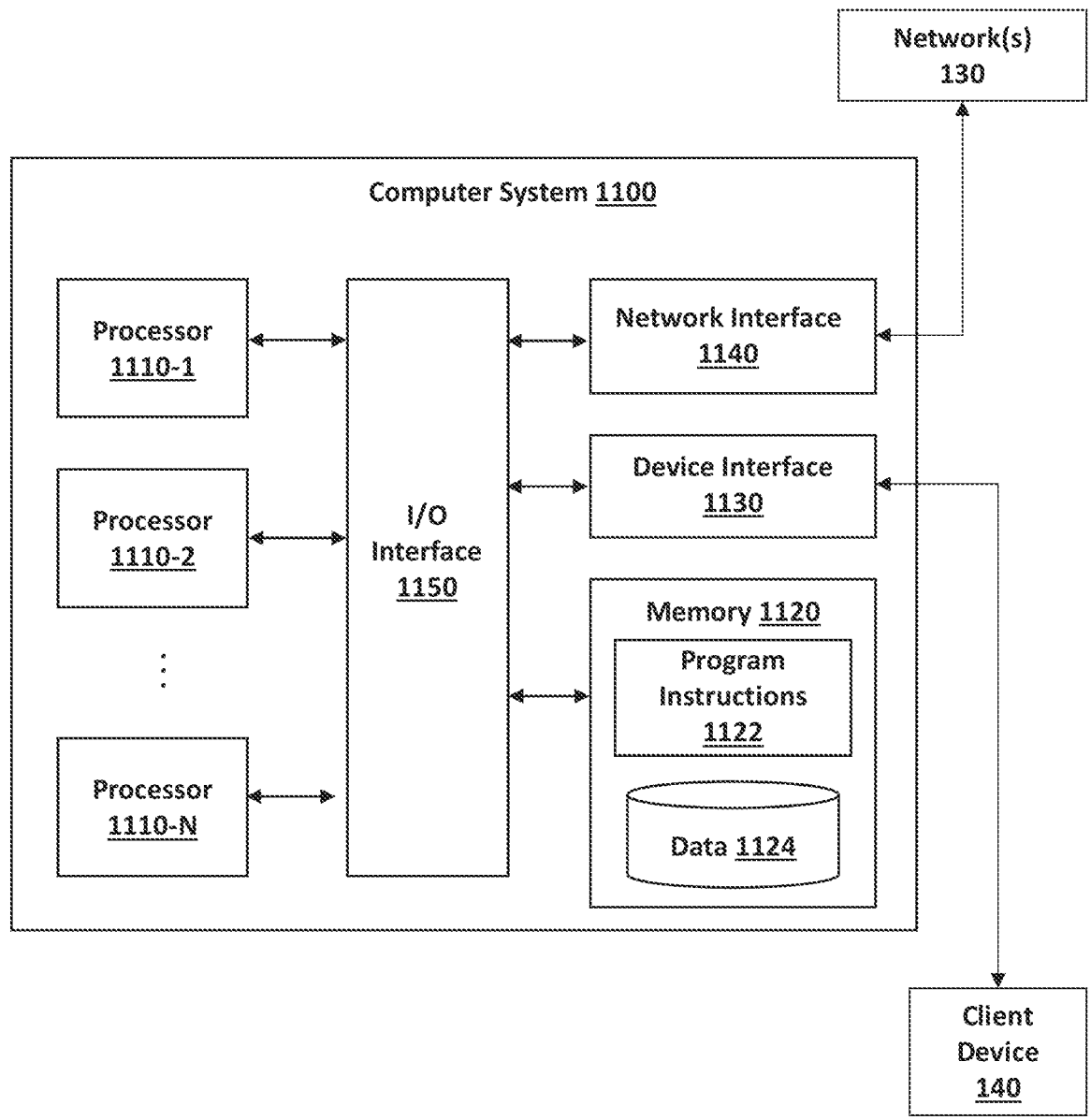
FIG. 11 is an illustrative diagram of an exemplary computing system upon which the present techniques may be implemented, in accordance with various embodiments.

FIG. 11 is an illustrative diagram of an exemplary computing device upon which the present techniques may be implemented, in accordance with various embodiments. In some cases, multiple instances of computer system 1100 may communicate via a network to implement the present techniques in a distributed fashion. In some cases, instances may include a mobile computing device (like a smartphone with a camera) that captures images upon which the present techniques operate. In some cases, the instances may include server-side instances (e.g., in a micro-services architecture or monolithic architecture) that execute training and analysis with trained models. Various portions of systems and methods described herein, may include or be executed on one or more computer systems similar to computer system 1100. Further, processes and modules described herein may be executed by one or more processing systems similar to that of computer system 1100. Still further, computer system 1100 may the same or similar to computer system 102 of FIG. 1 and the features described herein with respect to computer system 1100 may equally be implemented, in total or in part, by computer system 102.

Computer system 1100 may include one or more processors (e.g., processors 1110-1 to 1110-N) coupled to system memory 1120, an input/output I/O device interface 1130, and a network interface 1140 via an input/output (I/O) interface 1150. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computer system 1100. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1120). Computer system 1100 may be a uni-processor system including one processor (e.g., processor 1110-1), or a multi-processor system including any number of suitable processors (e.g., 1110-1 to 1110-N). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computer system 1100 may include a plurality of computing devices (e.g., distributed computer systems) to implement various processing functions.

I/O device interface 1130 may provide an interface for connection of one or more I/O devices, such as client device 140 or satellite ground station 120 to computer system 1100. I/O devices may include devices that receive input (e.g., from a user) or output information (e.g., to a user). I/O devices, e.g., client device 140, may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices may be connected to computer system 1100 through a wired or wireless connection. I/O devices may be connected to computer system 1100 from a remote location. I/O devices located on remote computer system, for example, may be connected to computer system 1100 via a network and network interface 1140.

Network interface 1140 may include a network adapter that provides for connection of computer system 1100 to a network. Network interface 1140 may facilitate data exchange between computer system 1100 and other devices connected to the network. Network interface 1140 may support wired or wireless communication. The network may include an electronic communication network, such as the Internet, a local area network (LAN), a wide area network (WAN), a cellular communications network, or the like.

System memory 1120 may be configured to store program instructions 1122 or data 1124. Program instructions 1122 may be executable by a processor (e.g., one or more of processors 1110-1 to 1110-N) to implement one or more embodiments of the present techniques. Program instructions 1122 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a standalone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1120 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1120 may include a non-transitory computer readable storage medium that may have program instructions stored thereon that are executable by a computer processor (e.g., one or more of processors 1110-1 to 1110-N) to cause the subject matter and the functional operations described herein. A memory (e.g., system memory 1120) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1150 may be configured to coordinate I/O traffic between processors 1110-1 to 1110-N, system memory 1120, network interface 1140, I/O devices (e.g., client device 140), and/or other peripheral devices. I/O interface 1150 may perform protocol, timing, or other data transformations to convert data signals from one component (e.g., system memory 1120) into a format suitable for use by another component (e.g., processors 1110-1 to 1110-N). I/O interface 1150 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1100 or multiple computer systems 1100 configured to host different portions or instances of embodiments. Multiple computer systems 1100 may provide for parallel or sequential processing/execution of one or more portions of the techniques described herein.

Those skilled in the art will appreciate that computer system 1100 is merely illustrative and is not intended to limit the scope of the techniques described herein. Computer system 1100 may include any combination of devices or software that may perform or otherwise provide for the performance of the techniques described herein. For example, computer system 1100 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1100 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1100 may be transmitted to computer system 1100 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y," "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the conversation management techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The present techniques will be better understood with reference to the following enumerated embodiments:

A1. A method, comprising: obtaining client data comprising satellite constellation access requests of a client for contacting a plurality of satellites, wherein: the satellite constellation access requests comprise satellite constellation access requirements and satellite constellation access targets, and each of the satellite constellation access targets has a weight indicating a level of importance of that satellite constellation access target; selecting, based on the satellite constellation access targets, at least one utility function from a plurality of utility functions to represent the satellite constellation access targets; generating utility data representing the at least one utility function having parameters tuned based on the satellite constellation access targets; determining a plurality of candidate satellite constellation access programs for the client based on the utility data, filtered satellite visibility data, and the weight associated with each of the satellite constellation access targets; for each of the plurality of candidate satellite constellation access programs, computing a quality score for each of the satellite constellation access targets; and computing a total quality score for the client based on the quality score for each of the satellite constellation access targets and the weight associated with each of the satellite constellation access targets; generating a ranking of the plurality of candidate satellite constellation access programs based on the total quality score computed for each of the plurality of candidate satellite constellation access programs; and selecting, based on the ranking of the plurality of candidate satellite constellation access programs, a satellite constellation access program for the client.

A2. The method of embodiment A1, further comprising: retrieving satellite visibility data; and filtering the satellite visibility data based on the satellite constellation access requirements to obtain filtered satellite visibility data.

A3. The method of embodiment A2, wherein the satellite visibility data is retrieved from a satellite location database.

A4. The method of any one of embodiments A2-A3, wherein the satellite visibility data comprises information indicating when each of a plurality of satellites of a satellite constellation is visible by satellite ground stations.

A5. The method of any one of embodiments A2-A4, wherein the satellite visibility data is computed based on an orbital trajectory of each satellite of the plurality of satellites.

A6. The method of any one of embodiments A1-A5, wherein the filtered satellite visibility data indicates temporal intervals capable of being allocated to the client for contacting the plurality of satellites.

A7. The method of any one of embodiments A1-A6, wherein each of the plurality of candidate satellite constellation access programs indicates a respective subset of temporal intervals allocatable to the client to access a satellite ground station to contact one or more of the plurality of satellites.

A8. The method of any one of embodiments A1-A7, wherein the quality score indicates a level of compliance for the client based on a value associated with each of the satellite constellation access targets.

A9. The method of any one of embodiments A1-A8, wherein the selected satellite constellation access program indicates a set of temporal intervals to be allocated to the client for accessing a satellite ground station to contact one or more of the plurality of satellites, wherein the plurality of satellites form a satellite constellation.

A10. The method of any one of embodiments A1-A9, further comprising: generating connectivity data for establishing a connection to the satellite ground station during each of the set of temporal intervals specified by the selected satellite constellation access program; and providing the connectivity data to a client device associated with the client such that the client is authorized to establish a secure connection to the satellite ground station during each of the set of temporal intervals.

A11. The method of any one of embodiments A1-A10, wherein the satellite constellation access requirements comprise: a minimum amount of time required during each contact with the one or more of the plurality of satellites; a maximum amount of time required during each contact with the one or more of the plurality of satellites; and a minimum number of contacts per day required with the one or more of the plurality of satellites.

A12. The method of any one of embodiments A1-A11, wherein the satellite constellation access targets comprise: an average amount of time for contacting the one or more of the plurality of satellites; a target number of contacts per day with the one or more of the plurality of satellites; and a maximum amount of time between consecutive contacts with the one or more of the plurality of satellites.

A13. The method of any one of embodiments A1-A12, wherein the plurality of utility functions comprise: a logistic function including at least a shape parameter and an offset parameter; a Gaussian distribution function including at least a mean parameter and a standard deviation parameter; a truncated Gaussian distribution function including at least the mean parameter, the standard deviation parameter, and a truncation parameter; and a half-life function including at least an initialization parameter and a decay rate parameter.

A14. The method of any one of embodiments A1-A13, wherein computing the total quality score comprises: retrieving, from a client score database, a previous total quality score associated with the client, the previous total quality score being computed based on previous satellite constellation access programs selected for the client; and generating the total quality score based on the previous total quality score, the quality score for each of the satellite constellation access targets, and the weight associated with each of the satellite constellation access targets.

A15. The method of any one of embodiments A1-A14, further comprising: retrieving a pre-determined quality score threshold for the client; determining a tier boost to apply to the total quality score in response to determining that the total quality score is less than the pre-determined quality score threshold; for each of the plurality of candidate satellite constellation access programs, computing an updated total quality score based on the total quality score and the tier boost, wherein the tier boost is applied to improve the total quality score for the client; and generating an updated ranking of the plurality of candidate satellite constellation access programs based on the updated total quality score computed for each of the plurality of candidate satellite constellation access programs; and selecting, based on the updated ranking of the plurality of candidate satellite constellation access programs, an updated satellite program for the client.

A16. The method of any one of embodiments A1-A15, further comprising: generating updated utility data representing the at least one utility function having the parameters modified based on the satellite constellation access targets; determining an updated plurality of candidate satellite constellation access programs for the client based on the updated utility data, the filtered satellite visibility data, and the weight associated with each of the satellite constellation access targets; for each of the updated plurality of candidate satellite constellation access programs: computing an updated quality score for each of the satellite constellation access targets; and computing an updated quality metric for the client based on the updated quality score for each of the satellite constellation access targets and the weight associated with each of the satellite constellation access targets; generating an updated ranking of the updated plurality of candidate satellite constellation access programs based on the updated quality metric computed for each of the updated plurality of candidate satellite constellation access programs; and selecting, based on the updated ranking of the updated plurality of candidate satellite constellation access programs, an updated satellite program for the client.

A17. The method of any one of embodiments A1-A16, further comprising: modifying at least one weight associated with the satellite constellation access targets; determining an updated plurality of candidate satellite constellation access programs for the client based on the utility data, the filtered satellite visibility data, and the at least one modified weight associated with the satellite constellation access targets; for each of the updated plurality of candidate satellite constellation access programs: computing an updated quality score for each of the satellite constellation access targets; and computing an updated quality metric for the client based on the updated quality score for each of the satellite constellation access targets and the at least one modified weight associated with each of the satellite constellation access targets; generating an updated ranking of the updated plurality of candidate satellite constellation access programs based on the updated quality metric computed for each of the updated plurality of candidate satellite constellation access programs; and selecting, based on the updated ranking of the plurality of candidate satellite constellation access programs, an updated satellite program for the client.

A18. The method of any one of embodiments A1-A17, further comprising: obtaining an additional plurality of candidate satellite constellation access programs for an additional client, the additional client, wherein: the additional client provides additional satellite constellation access requests including additional satellite constellation access targets and additional weights associated with each of the additional satellite constellation access targets, and at least one of the additional satellite constellation access targets is the same as at least one the satellite constellation access targets of the client; and for each of the plurality of candidate satellite constellation access programs, computing an additional total quality score for the additional client based on the total quality score computed for the client, wherein the satellite constellation access program is selected for the client based on the ranking of the plurality of candidate satellite constellation access programs and the additional total quality score computed for the additional client for each of the plurality of candidate satellite constellation access programs to determine an impact of a given candidate satellite constellation access program on the additional client.

A19. The method of any one of embodiments A1-A18, wherein each of the plurality of candidate satellite constellation access programs indicates (i) a time interval that a satellite is available to be contacted by the client via a satellite ground station and (ii) that accessing the satellite during the time interval satisfies the satellite constellation access requirements.

A20. The method of embodiment A19, wherein computing the total quality score for each of the plurality of candidate satellite constellation access programs comprises: determining whether an additional candidate satellite constellation access program associated with an additional client also indicates a same time interval for accessing the satellite; determining whether the client or the additional client is to be allocated the time interval based on (i) the satellite constellation access targets of the client, (ii) the weight associated with each of the satellite constellation access targets of the client, (iii) satellite constellation access targets of the additional client, and (iv) weights assigned to the satellite constellation access targets of the additional client; and calculating the total quality score for each of the plurality of candidate satellite constellation access programs based on a determination that: the client is to be allocated the time interval, the additional client is to be allocated the time interval, or neither the client nor the additional client is to be allocated the time interval.

B1. A method, comprising: obtaining first data comprising one or more targets for accessing a satellite constellation; generating, based on the first data, a set of representations including parameters tuned to characterize the one or more targets; determining first candidate satellite constellation access programs for accessing the satellite constellation based on the set of representations; for each of the first candidate satellite constellation access programs: computing a first score for each of the one or more targets to obtain a first set of first scores, each first score indicating a level of compliance associated with a given candidate satellite constellation access program; computing a second score for each first score of the first set of first scores based on a weight associated with a corresponding target to obtain a first set of second scores; and selecting a first satellite constellation access program from the first candidate satellite constellation access programs based on the first set of second scores.

B2. The method of embodiment B1, further comprising: providing, to a client device, connectivity data for facilitating communications between a satellite ground station and one or more satellites of the satellite constellation, wherein the connectivity data is generated based on the first satellite constellation access program.

B3. The method of embodiment B2, wherein the client device is configured to access the satellite ground station to provide data to the one or more satellites of the satellite constellation or receive data from the one or more satellites of the satellite constellation based on the connectivity data.

B4. The method of any one of embodiments B2-B3, wherein the connectivity data establishes a secure connection between the client device and the satellite ground station.

B5. The method of any one of embodiments B1-B4, wherein the first satellite constellation access program indicates a set of temporal intervals to be allocated to a client for accessing a satellite ground station to contact one or more satellites of the satellite constellation.

B6. The method of any one of embodiments B1-B5, wherein the first data comprises one or more conditions for accessing the satellite constellation.

B7. The method of embodiment B6, further comprising: retrieving satellite visibility data; and generating filtered satellite visibility data by filtering the satellite visibility data to remove visibilities of the satellite constellation that fail to satisfy the one or more conditions, wherein the first candidate satellite constellation access programs are selected from visibilities of the satellite constellation that were not removed based on the one or more conditions.

B8. The method of embodiment B7, wherein the satellite visibility data indicates when satellites of the satellite constellation are visible by one or more satellite ground stations.

B9. The method of embodiment B6, wherein the one or more conditions for accessing the satellite constellation comprise at least one of: a minimum amount of time required during each contact one or more satellite of the satellite constellation; a maximum amount of time required during each contact with the one or more satellite of the satellite constellation; or a minimum number of contacts per day required with the one or more satellite of the satellite constellation.

B10. The method of any one of embodiments B1-B9, wherein the one or more targets comprise at least one of: an average amount of time for contacting one or more satellite of the satellite constellation; a target number of contacts per day with the one or more satellite of the satellite constellation; or a maximum amount of time between consecutive contacts with the one or more satellite of the satellite constellation.

B11. The method of any one of embodiments B1-B10, wherein computing the second score for each first score of the first set of first scores comprises: retrieving, from a client, a previously computed second score associated with the client based on previous satellite constellation access programs selected for the client; and generating the second score based on the previously computed second score and a corresponding first score of the first set of first scores for each of the one or more targets.

B12. The method of any one of embodiments B1-B11, wherein the first data comprises weights for each of the one or more targets.

B13. The method of embodiment B12, wherein computing the second score further comprises: applying the weight associated the corresponding target to a corresponding first score of the first set of first scores, wherein the second score is computed based on a weighted combination of a weighted version of the first score of each of the one or more targets.

B14. The method of embodiment B12, further comprising: responsive to determining that the second score is less than a threshold score, causing at least one of the weights associated with at least one of the one or more targets to be modified; determining second candidate satellite constellation access programs for accessing the satellite constellation based on the set of representations and the at least one modified weight; for each of the second candidate satellite constellation access programs: computing an updated first score for each of the one or more targets to obtain a second set of first scores; and computing an updated second score based on each updated first score of the second set of first scores based on the at least one modified weight to obtain a second set of second scores; and selecting a second satellite constellation access program from the second candidate satellite constellation access programs based on the second set of second scores.

B15. The method of any one of embodiments B1-B14, further comprising: determining that each second score of the first set of second scores is less than a threshold score; generating, based on the first data, an updated set of representations including additional parameters tuned to characterize the one or more targets; determining second candidate satellite constellation access programs for accessing with the satellite constellation based on the updated set of representations; for each of the second candidate satellite constellation access programs, computing an updated first score for each of the one or more targets to obtain a second set of first scores; computing an updated second score for each updated first score of the second set of first scores based on the weight associated with a corresponding target to obtain a second set of second scores; and selecting a second satellite constellation access program from the second candidate satellite constellation access programs based on the second set of second scores.

B16. The method of any one of embodiments B1-B15, further comprising: generating a ranking of the first candidate satellite constellation access programs based on the first set of second scores, wherein the first satellite constellation access program is selected based on the ranking of the first candidate satellite constellation access programs.

B17. The method of any one of embodiments B1-B16, wherein determining the first candidate satellite constellation access programs comprises: obtaining second data comprising one or more additional targets for accessing a satellite constellation, wherein the first data is associated with a first client and the second data is associated with a second client; and determining whether a conflict exist between the first client and the second client based on the one or more targets of the first client and the one or more additional targets of the second client, wherein the first candidate satellite constellation access programs are selected based on a resolution of the conflict for the first client or the second client based on the set of representations representing the one or more targets generated for the first client and a set of representations representing the one or more additional targets generated for the second client.

B18. The method of any one of embodiments B1-B17, wherein each representation included in the set of representations comprise at least one of: a logistic function including at least a shape parameter and an offset parameter; a Gaussian distribution function including at least a mean parameter and a standard deviation parameter; a truncated Gaussian distribution function including at least the mean parameter, the standard deviation parameter, and a truncation parameter; or a half-life function including at least an initialization parameter and a decay rate parameter.

C1. One or more tangible, non-transitory, machine-readable media storing instructions that, when executed by one or more processors, effectuate operations comprising those of any of embodiments A1-A20 or B1-B18.

D1. A system comprising: one or more processors; and memory storing computer program instructions that, when executed by the one or more processors, cause the one or more processors to effectuate operations comprising those of any of embodiments A1-A20 or B1-B18.

The invention claimed is:

1. A method for generating a satellite program for contacting satellites, the method comprising:
obtaining first data comprising one or more targets for accessing a satellite constellation;
generating, based on the first data, a set of representations including parameters tuned to characterize the one or more targets;
determining first candidate satellite constellation access programs for accessing the satellite constellation based on the set of representations;
for each of the first candidate satellite constellation access programs:
computing a first score for each of the one or more targets to obtain a first set of first scores, each first score indicating a level of compliance associated with a given candidate satellite constellation access program;
computing a second score for each first score of the first set of first scores based on a weight associated with a corresponding target to obtain a first set of second scores; and
selecting a first satellite constellation access program from the first candidate satellite constellation access programs based on the first set of second scores.

2. The method of claim 1, further comprising:
providing, to a client device, connectivity data for facilitating communications between a satellite ground station and one or more satellites of the satellite constellation, wherein the connectivity data is generated based on the first satellite constellation access program.

3. The method of claim 1, wherein the first data further comprises one or more conditions for accessing the satellite constellation, the method further comprises:
retrieving satellite visibility data indicating when satellites of the satellite constellation are visible by one or more satellite ground stations; and
generating filtered satellite visibility data by filtering the satellite visibility data to remove visibilities of the satellite constellation via the one or more satellite ground stations that fail to satisfy the one or more conditions, wherein the first candidate satellite constellation access programs are selected from visibilities of the satellite constellation that were not removed based on the one or more conditions.

4. The method of claim 1, wherein computing the second score for each first score of the first set of first scores comprises:
retrieving, from a client, a previously computed second score associated with the client based on previous satellite constellation access programs selected for the client; and
generating the second score based on the previously computed second score and a corresponding first score of the first set of first scores for each of the one or more targets.

5. The method of claim 1, wherein the first data comprises weights for each of the one or more targets, computing the second score further comprises:
applying the weight associated the corresponding target to a corresponding first score of the first set of first scores, wherein the second score is computed based on a weighted combination of a weighted version of the first score of each of the one or more targets.

6. The method of claim 1, wherein the first data further comprises weights for each of the one or more targets, the method further comprises:
responsive to determining that the second score is less than a threshold score, causing at least one of the weights associated with at least one of the one or more targets to be modified;
determining second candidate satellite constellation access programs for accessing the satellite constellation based on the set of representations and the at least one modified weight;
for each of the second candidate satellite constellation access programs:
computing an updated first score for each of the one or more targets to obtain a second set of first scores; and
computing an updated second score based on each updated first score of the second set of first scores based on the at least one modified weight to obtain a second set of second scores; and
selecting a second satellite constellation access program from the second candidate satellite constellation access programs based on the second set of second scores.

7. The method of claim 1, further comprising:
determining that each second score of the first set of second scores is less than a threshold score;
generating, based on the first data, an updated set of representations including additional parameters tuned to characterize the one or more targets;
determining second candidate satellite constellation access programs for accessing with the satellite constellation based on the updated set of representations;
for each of the second candidate satellite constellation access programs,
computing an updated first score for each of the one or more targets to obtain a second set of first scores;
computing an updated second score for each updated first score of the second set of first scores based on the weight associated with a corresponding target to obtain a second set of second scores; and
selecting a second satellite constellation access program from the second candidate satellite constellation access programs based on the second set of second scores.

8. The method of claim 1, further comprising:
generating a ranking of the first candidate satellite constellation access programs based on the first set of second scores, wherein the first satellite constellation access program is selected based on the ranking of the first candidate satellite constellation access programs.

9. The method of claim 1, wherein determining the first candidate satellite constellation access programs comprises:
obtaining second data comprising one or more additional targets for accessing a satellite constellation, wherein the first data is associated with a first client and the second data is associated with a second client; and
determining whether a conflict exist between the first client and the second client based on the one or more targets of the first client and the one or more additional targets of the second client, wherein the first candidate satellite constellation access programs are selected based on a resolution of the conflict for the first client or the second client based on the set of representations representing the one or more targets generated for the first client and a set of representations representing the one or more additional targets generated for the second client.

10. A system for generating a satellite program for contacting satellites, the system comprising:
a computer system comprising one or more processors programmed with computer program instructions that, when executed, cause the computer system to:
obtain first data comprising one or more targets for accessing a satellite constellation;
generate, based on the first data, a set of representations including parameters tuned to characterize the one or more targets;
determine first candidate satellite constellation access programs for accessing the satellite constellation based on the set of representations;
for each of the first candidate satellite constellation access programs:
compute a first score for each of the one or more targets to obtain a first set of first scores, each first score indicating a level of compliance associated with a given candidate satellite constellation access program; and
compute a second score for each first score of the first set of first scores based on a weight associated with a corresponding target to obtain a first set of second scores; and
select a first satellite constellation access program from the first candidate satellite constellation access programs based on the first set of second scores.

11. The system of claim 10, wherein the computer system is further cause to:
provide, to a client device, connectivity data for facilitating communications between a satellite ground station and one or more satellites of the satellite constellation, wherein the connectivity data is generated based on the first satellite constellation access program.

12. The system of claim 10, wherein the first data further comprises one or more conditions for accessing the satellite constellation, the computer system is further caused to:
retrieve satellite visibility data indicating when satellites of the satellite constellation are visible by one or more satellite ground stations; and
generate filtered satellite visibility data by filtering the satellite visibility data to remove visibilities of the satellite constellation via the one or more satellite ground stations that fail to satisfy the one or more conditions, wherein the first candidate satellite constellation access programs are selected from visibilities of the satellite constellation that were not removed based on the one or more conditions.

13. The system of claim 10, wherein the second score being computed for each first score of the first set of first scores comprises the computer system being caused to:
retrieve, from a client, a previously computed second score associated with the client based on previous satellite constellation access programs selected for the client; and
generate the second score based on the previously computed second score and a corresponding first score of the first set of first scores for each of the one or more targets.

14. The system of claim 10, wherein the first data comprises weights for each of the one or more targets, the second score being computed comprises the computer system being caused to:
apply the weight associated the corresponding target to a corresponding first score of the first set of first scores, wherein the second score is computed based on a weighted combination of a weighted version of the first score of each of the one or more targets.

15. The system of claim 10, wherein the first data further comprises weights for each of the one or more targets, the computer system being further caused to:
responsive to determining that the second score is less than a threshold score, cause at least one of the weights associated with at least one of the one or more targets to be modified;
determine second candidate satellite constellation access programs for accessing the satellite constellation based on the set of representations and the at least one modified weight;
for each of the second candidate satellite constellation access programs:
compute an updated first score for each of the one or more targets to obtain a second set of first scores; and
compute an updated second score based on each updated first score of the second set of first scores based on the at least one modified weight to obtain a second set of second scores; and
select a second satellite constellation access program from the second candidate satellite constellation access programs based on the second set of second scores.

16. The system of claim 10, wherein the computer system is further caused to:
determine that each second score of the first set of second scores is less than a threshold score;
generate, based on the first data, an updated set of representations including additional parameters tuned to characterize the one or more targets;
determine second candidate satellite constellation access programs for accessing with the satellite constellation based on the updated set of representations;
for each of the second candidate satellite constellation access programs,
compute an updated first score for each of the one or more targets to obtain a second set of first scores; and
compute an updated second score for each updated first score of the second set of first scores based on the weight associated with a corresponding target to obtain a second set of second scores; and
select a second satellite constellation access program from the second candidate satellite constellation access programs based on the second set of second scores.

17. The system of claim 10, wherein the computer system is further caused to:
generate a ranking of the first candidate satellite constellation access programs based on the first set of second scores, wherein the first satellite constellation access program is selected based on the ranking of the first candidate satellite constellation access programs.

18. The system of claim 10, wherein the first candidate satellite constellation access programs being selected comprises the computer system being caused to:
obtain second data comprising one or more additional targets for accessing a satellite constellation, wherein the first data is associated with a first client and the second data is associated with a second client; and
determine whether a conflict exist between the first client and the second client based on the one or more targets of the first client and the one or more additional targets of the second client, wherein the first candidate satellite constellation access programs are selected based on a resolution of the conflict for the first client or the second client based on the set of representations representing the one or more targets generated for the first client and a set of representations representing the one or more additional targets generated for the second client.

19. A non-transitory computer-readable medium storing computer program instructions that, when executed by one or more processors, effectuate operations comprising:
   obtaining first data comprising one or more targets for accessing a satellite constellation;
   generating, based on the first data, a set of representations including parameters tuned to characterize the one or more targets;
   determining first candidate satellite constellation access programs for accessing the satellite constellation based on the set of representations;
   for each of the first candidate satellite constellation access programs:
      computing a first score for each of the one or more targets to obtain a first set of first scores, each first score indicating a level of compliance associated with a given candidate satellite constellation access program;
      computing a second score for each first score of the first set of first scores based on a weight associated with a corresponding target to obtain a first set of second scores; and
   selecting a first satellite constellation access program from the first candidate satellite constellation access programs based on the first set of second scores.

* * * * *